(12) United States Patent
Zhang et al.

(10) Patent No.: US 12,463,705 B2
(45) Date of Patent: Nov. 4, 2025

(54) DETECTION OF NEAR-FIELD LOCATION FOR WIRELESS COMMUNICATIONS

(71) Applicant: QUALCOMM Incorporated, San Diego, CA (US)

(72) Inventors: Danlu Zhang, San Diego, CA (US); Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/328,642

(22) Filed: Jun. 2, 2023

(65) Prior Publication Data

US 2024/0405841 A1    Dec. 5, 2024

(51) Int. Cl.
*H04W 4/00*    (2018.01)
*H04B 7/06*    (2006.01)

(52) U.S. Cl.
CPC ................ *H04B 7/06966* (2023.05)

(58) Field of Classification Search
CPC ........ H01Q 3/2605; H04B 7/086; H04B 7/04; H04B 7/0814; H04B 7/02; H04B 7/0404
See application file for complete search history.

(56) References Cited

U.S. PATENT DOCUMENTS

| 2018/0131434 A1* | 5/2018 | Islam ................... H04B 7/0408 |
| 2020/0106511 A1* | 4/2020 | Davis ..................... H01Q 1/523 |
| 2021/0273345 A1* | 9/2021 | Moon ..................... H01Q 21/20 |
| 2023/0163831 A1 | 5/2023 | Raghavan et al. |

FOREIGN PATENT DOCUMENTS

| WO | WO-2022266913 A1 | 12/2022 |
| WO | WO-2023050131 A1 | 4/2023 |

OTHER PUBLICATIONS

International Search Report and Written Opinion—PCT/US2024/026778—ISA/EPO—Sep. 20, 2024.

* cited by examiner

*Primary Examiner* — Shantell L Heiber
(74) *Attorney, Agent, or Firm* — Holland & Hart LLP/Qualcomm Incorporated

(57) ABSTRACT

Methods, systems, and devices for wireless communications are described, including detection of whether a first wireless device is location within a near-field distance of a second wireless device. The first wireless device measures phases of reference signals received at first antenna array of the first antenna array from a second antenna array of the second wireless device. The first wireless device determines, based on the phases, the values of quadratic terms associated with an equation for calculating the distance between a first antenna of the first antenna array and the center of the first antenna array or for calculating the distance between a second antenna of the second antenna array and the center of the second antenna array. The first wireless device determines, based on the quadratic terms, whether the first wireless device is within the near-field distance of the second wireless device.

30 Claims, 10 Drawing Sheets

DETECTION OF NEAR-FIELD LOCATION FOR WIRELESS COMMUNICATIONS

FIELD OF TECHNOLOGY

The following relates to wireless communications, including detection of near-field location for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support detection of near-field location for wireless communications. A first wireless device (e.g., a receiver device or a first user equipment (UE)) may determine the distance between the first wireless device and a second wireless device (e.g., a transmitter device or a second UE), and the determined distance may be used to distinguish between the near-field and the far-field. To determine the distance, the first wireless device may receive reference signals at a first antenna array of the first wireless device from a second antenna array of the second wireless device. The first wireless device may measure phases of the reference signals. Each of the phases may correspond to a respective antenna pair that includes a first antenna of the first antenna array and a second antenna of the second antenna array. An equation related to distance between two antennas of the different arrays includes first order (linear, to the power of 1) and second order (quadratic, to the power of 2) terms, which may be referred to as first order angle parameters and second order angle parameters, respectively.

Based on phase measurements of the reference signals, one or more equations may be solved to derive the first order angle parameters and second order angle parameters. In some examples, solving the one or more equations may involve linear regression, statistical analysis, predictive analysis, or other mathematical equations or forms of analysis. If at least one of the second order angle parameters satisfies (e.g., is greater than) a threshold, then the first wireless device may determine that the distance between the first wireless device and the second wireless device is a near-field distance (less than the far-field distance), and the first wireless device may communicate with the second wireless device accordingly. If none of the second order angle parameters satisfy (e.g., are greater than) the threshold, then the first wireless device may determine that the distance between the first wireless device and the second wireless device is a far-field distance (greater than the far-field distance) and the first wireless device may communicate with the second wireless device accordingly.

In some cases, to determine the second order angle parameters, the first wireless device may receive an indication of a second distance vector that includes distances between respective antennas of the second antenna array and a center of the second antenna array. The first wireless device may be aware of a first distance vector including distances between respective antennas of the first antenna array and a center of the first antenna array. For example, the first wireless device may perform statistical analysis (e.g., linear regression) or another form of analysis on the phases using the first distance vector and the second distance vector.

In some cases, to determine the second order angle parameters, the first wireless device may receive an indication of spacing between antennas of the second antenna array. The first wireless device may perform linear regression or other analysis on the phases based on a mapping between respective antenna indices for antennas of the first antenna array and respective distances from a center of the second antenna array. In some cases, the first wireless device may use the determined second order angle parameters to determine a first orientation angle parameter and a second orientation angle parameter that may be used to adjust the orientation of the first antenna array.

A method for wireless communications at a first wireless device is described. The method may include receiving, at a first antenna array, a set of multiple reference signals from a second antenna array of a second wireless device, measuring a set of multiple phases of the set of multiple reference signals, where the set of multiple phases correspond to respective antenna pairs that each include a respective first antenna of the first antenna array and a respective second antenna of the second antenna array, determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array, determining that at least one second order angle parameter of the set of multiple second order angle parameters satisfies an angle parameter threshold, and communicating with the second wireless device based on the determination that at least one second order angle parameter of the set of multiple second order angle parameters satisfies the angle parameter threshold.

An apparatus for wireless communications at a first wireless device is described. The apparatus may include a memory, a transceiver, and at least one processor of the first wireless device, the at least one processor coupled with the memory and the transceiver. The at least one processor may be configured to cause the apparatus to receive, at a first antenna array, a set of multiple reference signals from a second antenna array of a second wireless device, measure a set of multiple phases of the set of multiple reference signals, where the set of multiple phases correspond to respective antenna pairs that each include a respective first antenna of the first antenna array and a respective second antenna of the second antenna array, determine, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array, determine that at least one second order angle parameter of the set of multiple second order angle parameters satisfies an angle parameter threshold, and communicate with the second wireless device based on the determination that at least one second order angle parameter of the set of multiple second order angle parameters satisfies the angle parameter threshold.

Another apparatus for wireless communications at a first wireless device is described. The apparatus may include means for receiving, at a first antenna array, a set of multiple reference signals from a second antenna array of a second wireless device, means for measuring a set of multiple phases of the set of multiple reference signals, where the set of multiple phases correspond to respective antenna pairs that each include a respective first antenna of the first antenna array and a respective second antenna of the second antenna array, means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array, means for determining that at least one second order angle parameter of the set of multiple second order angle parameters satisfies an angle parameter threshold, and means for communicating with the second wireless device based on the determination that at least one second order angle parameter of the set of multiple second order angle parameters satisfies the angle parameter threshold.

A non-transitory computer-readable medium storing code for wireless communications at a first wireless device is described. The code may include instructions executable by a processor to receive, at a first antenna array, a set of multiple reference signals from a second antenna array of a second wireless device, measure a set of multiple phases of the set of multiple reference signals, where the set of multiple phases correspond to respective antenna pairs that each include a respective first antenna of the first antenna array and a respective second antenna of the second antenna array, determine, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array, determine that at least one second order angle parameter of the set of multiple second order angle parameters satisfies an angle parameter threshold, and communicate with the second wireless device based on the determination that at least one second order angle parameter of the set of multiple second order angle parameters satisfies the angle parameter threshold.

Some examples of the method, apparatuses, and non-transitory computer-readable medium described herein may further include operations, features, means, or instructions for receiving, from the second wireless device, an indication of a second distance vector for the second antenna array, the second distance vector including distances between respective antennas of the second antenna array and the center of the second antenna array, where determining the set of multiple first order angle parameters and the set of multiple second order angle parameters may be further based on the second distance vector and a first distance vector for the first antenna array, the first distance vector including distances between respective antennas of the first antenna array and the center of the first antenna array.

Some examples of the method, apparatuses, and non-transitory computer-readable medium described herein may further include operations, features, means, or instructions for receiving an indication of a spacing between antennas of the second antenna array, where determining the set of multiple first order angle parameters and the set of multiple second order angle parameters may be further based on a mapping between respective antenna indices for antennas of the first antenna array and respective distances from the center of the second antenna array.

In some examples of the method, apparatuses, and non-transitory computer-readable medium described herein, operations, features, means, or instructions for determining that at least one of the set of multiple second order angle parameters satisfies the angle parameter threshold may include operations, features, means, or instructions for determining that a second order angle parameter has a magnitude that satisfies the angle parameter threshold, where the angle parameter threshold may be based on a standard deviation associated with the second order angle parameter, or operations, features, means, or instructions for determining that a square of a second order angle parameter satisfies the angle parameter threshold, where the angle parameter threshold may be based on a statistical variance associated with the second order angle parameter.

Some examples of the method, apparatuses, and non-transitory computer-readable medium described herein may further include operations, features, means, or instructions for receiving, at the first antenna array, a second set of multiple reference signals from a third antenna array of a third wireless device, measuring a second set of multiple phases of the second set of multiple reference signals, where the second set of multiple phases correspond to respective antenna pairs that each include a respective first antenna of the first antenna array and a respective third antenna of the third antenna array, determining, based on the second set of multiple phases, a second set of multiple angle parameters including a second set of multiple first order angle parameters and a second set of multiple second order angle parameters, where the second set of multiple first order angle parameters includes linear terms associated with a distance between the first antenna of the first antenna array and the center of the first antenna array or a distance between a third antenna of the third antenna array and a center of the third antenna array, and where the set of multiple second order angle parameters includes quadratic terms associated with the distance between the first antenna of the first antenna array and the center of the first antenna array or the distance between the third antenna of the third antenna array and the center of the third antenna array, determining that none of the second set of multiple second order angle parameters satisfy the angle parameter threshold, and communicating with the third wireless device based on the determination that none of the second set of multiple second order angle parameters satisfy the angle parameter threshold.

Some examples of the method, apparatuses, and non-transitory computer-readable medium described herein may further include operations, features, means, or instructions for receiving a unique identifier associated with each of the set of multiple reference signals, where the set of multiple reference signals may be frequency-division multiplexed with one another, time-division multiplexed with one another, or any combination thereof.

Some examples of the method, apparatuses, and non-transitory computer-readable medium described herein may further include operations, features, means, or instructions for determining a first orientation angle parameter associated with the first wireless device and a second orientation angle parameter associated with the second wireless device, the first orientation angle parameter and the second orientation angle parameter based on the set of multiple second order angle parameters, and adjusting orientation of the first antenna array based on the first orientation angle parameter, the second orientation angle parameter, or any combination thereof.

Some examples of the method, apparatuses, and non-transitory computer-readable medium described herein may further include operations, features, means, or instructions for transmitting, to the second wireless device, an indication of whether the first wireless device is located within a near-field communication distance or a far-field communication distance relative to the second wireless device.

In some examples of the method, apparatuses, and non-transitory computer-readable medium described herein, the indication includes an indication of beam weights to be applied to the set of multiple reference signals, the beam weights based on whether the first wireless device is located within the near-field communication distance or the far-field communication distance relative to the second wireless device.

Some examples of the method, apparatuses, and non-transitory computer-readable medium described herein may further include operations, features, means, or instructions for determining the set of multiple first order angle parameters based on determining the set of multiple second order angle parameters.

DETAILED DESCRIPTION

Figure 1:
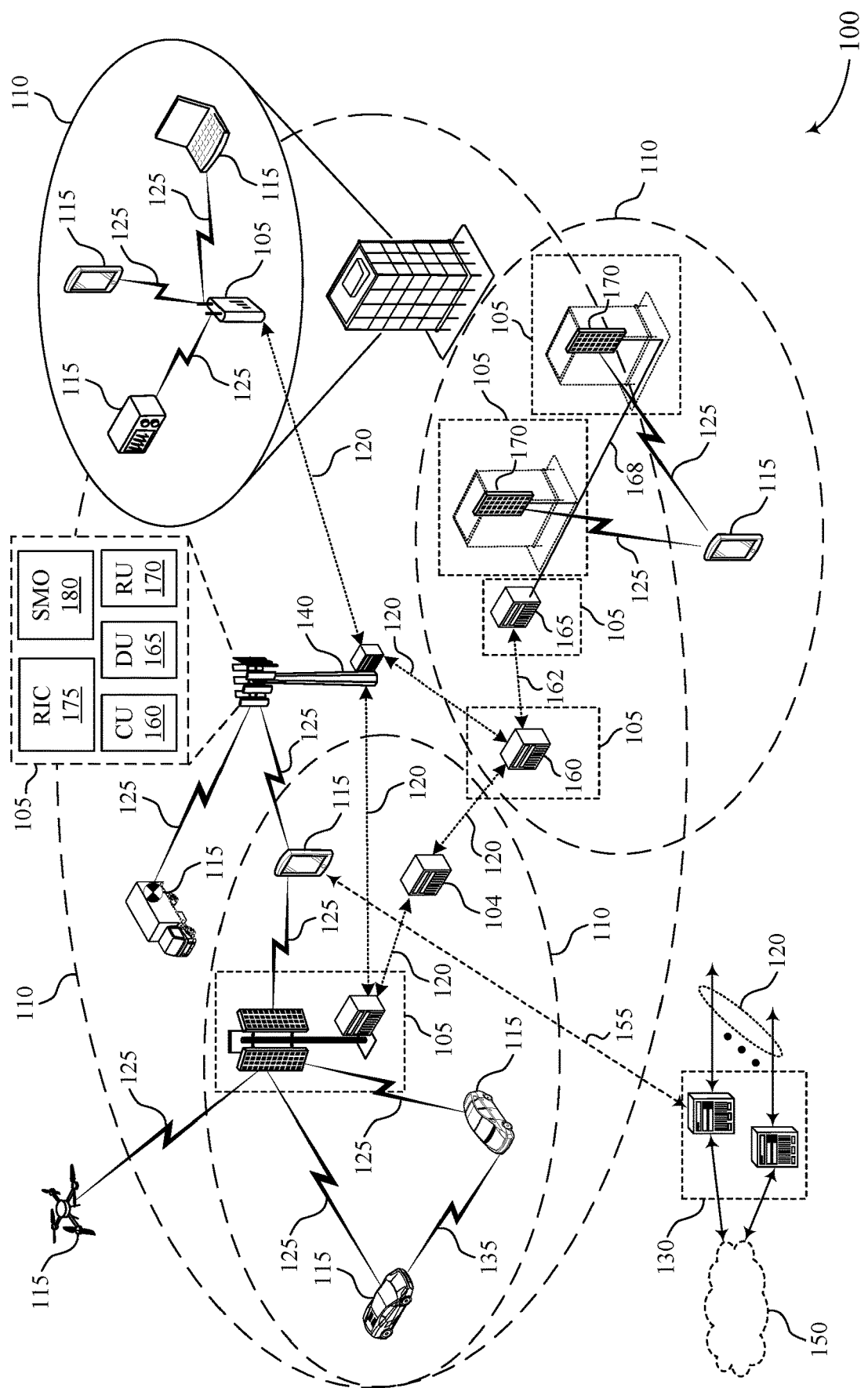
FIG. 1 shows an example of a wireless communications system that supports detection of near-field location for wireless communications in accordance with one or more aspects of the present disclosure.

In some wireless communication systems, such as multiple-input multiple-output (MIMO) communication systems, wireless devices may perform beamforming so that reference signals from the wireless devices are transmitted in a particular direction. Often, wireless communication techniques may vary based on whether the wireless devices are positioned within a near-field communication distance or a far-field communication distance relative to each other. For example, beam weights applied to the reference signals may vary based on whether the wireless devices are within the near-field communication distance or the far-field communication distance from each other. As another example, calibration of antenna parameters of antenna array panels of each of the wireless devices may vary based on whether the wireless devices are within the near-field communication distance or within the far-field communication distance.

The boundary of near-field and far-field may be based on antenna array panel sizes and wavelengths of the reference signals. In some cases, a wireless communication system may be a high frequency wireless communication system (e.g., a 6G network), where the wavelengths are shorter and the antenna array panels are larger with respect to lower frequency wireless communications systems. As the wavelength decreases, the coverage area of the near-field may increase (e.g., varying boundary). Thus, as communications frequencies get higher, the near-field distance gets larger, and it becomes more likely that two devices in communication with other may need to account for near-field effects in order to effectively communicate.

Determining the exact distance between two wireless devices may be difficult, but techniques as described herein may be used by a wireless device to determine whether the wireless device is located within the near-field of a second wireless device (e.g., whether the separation distance between the two wireless devices is less than or greater than a far-field distance for the frequency of communications between the two wireless devices). A first wireless device (e.g., a receiver device) may receive reference signals at a first antenna array of the first wireless device from a second antenna array of the second wireless device. The first wireless device may measure phases of the reference signals. Each of the phases may correspond to a respective antenna pair that includes a first antenna of the first antenna array and a second antenna of the second antenna array. As used herein, an antenna array may refer to a collection of antenna elements, and an antenna of an antenna array may refer to a single antenna element included in the antenna array or to a group of antenna elements included in the antenna array. An equation related to distance between two antennas of the different arrays includes first order (linear, to the power of 1) and second order (quadratic, to the power of 2) terms, which may be referred to as first order angle parameters and second order angle parameters respectively.

Based on phase measurements of the reference signals, statistical analysis (e.g., linear regression) or another form of analysis may be used to derive the first order (e.g., linear, to the power of 1) angle parameters and second order (e.g., quadratic, to the power of 2) angle parameters. If at least one of the second order angle parameters satisfies a threshold (e.g., is greater than zero or greater than a statistically significant value), then the first wireless device may determine that the distance between the first wireless device and the second wireless device is a near-field distance (e.g., is smaller than the far-field distance, meaning that the first device is nearer to the second wireless device than the far-field boundary for wireless communications between the devices), and the first wireless device may communicate with the second wireless device accordingly. If none of the second order angle parameters satisfy the threshold, then the first wireless device may determine that the distance between the first wireless device and the second wireless device is a far-field distance (greater than the far-field distance, meaning that the first device is farther from the second wireless device than the far-field boundary for wireless communications between the devices), and the first wireless device may communicate with the second wireless device accordingly.

In some cases, in order to determine the second order angle parameters, the first wireless device may receive an indication of a second distance vector that includes distances between respective antennas of the second antenna array and a center of the second antenna array. The first wireless device may be aware of a first distance vector including distances between respective antennas of the first antenna array and a center of the first antenna array. The first wireless device may perform statistical analysis (e.g., linear regression) or another form of analysis on the phases using the first distance vector and the second distance vector.

In some cases, in order to determine the second order angle parameters, the first wireless device may receive an indication of spacing between antennas of the second antenna array. The first wireless device may perform linear regression or other analysis on the phases based on a mapping between respective antenna indices for antennas of the first antenna array and respective distances from a center of the second antenna array. In some cases, the first wireless device may use the determined second order angle parameters to determine a first orientation angle parameter and a second orientation angle parameter that may be used to adjust the orientation of the first antenna array.

Aspects of the disclosure are initially described in the context of wireless communications systems. Aspects of the disclosure are further illustrated by and described with reference to apparatus diagrams, system diagrams, and flowcharts that relate to detection of near-field location for wireless communications. Although some aspects of the following descriptions discuss the first wireless device performing linear regression to determine various parameters (e.g., angle parameters, phase parameters, etc.), the techniques described herein may additionally, or alternatively, apply to a wireless device performing other types of mathematical operations, calculations, or analysis, such as other forms of statistical analysis or predictive analysis.

FIG. 1 shows an example of a wireless communications system 100 that supports detection of near-field location for wireless communications in accordance with one or more aspects of the present disclosure. The wireless communications system 100 may include one or more network entities 105, one or more UEs 115, and a core network 130. In some examples, the wireless communications system 100 may be a Long-Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or Rus 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more Rus 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more Rus 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more Rus 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support detection of near-field location for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, Rus 170) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, Rus 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170)

may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In MIMO communication systems, the UEs 115 may perform beamforming so that reference signals from the UEs 115 are transmitted in a particular direction. However, beam weights that are applied to the reference signals may vary based on whether the UEs 115 are separated by a near-field communication distance or the far-field communication distance. Measuring the distance between the UEs 115 to communicate in the near-field or far-field, and thus, applying the appropriate beam weights (e.g., using beam weights based on near-field or far-field), may be difficult.

For example, multiple antenna beamforming is commonly used in high frequency wireless communication systems, such as 5G frequency range 2 (FR2), 5G frequency range 4 (FR4), or Sub-Terahertz (Sub-THz). The distance between devices communicating in these wireless communication systems and implementing multiple antenna beamforming may be a near-field distance or a far-field distance. Near-field may refer to a distance equal to or less than $D^2/\lambda$ and far-field may refer to a distance greater than $D^2/\lambda$, where D refers to an antenna array panel size and $\lambda$ refers to a wavelength of the beams.

In some examples, beam weights applied to beams for beamforming have different characteristics in near-field and far-field, which may be characterized as three-dimensional (3D) beamforming for near-field and two-dimensional (2D) beamforming for far-field. In the 2D beamforming, the beam radiation pattern may radiate in a horizontal plane. In 3D beamforming, the radiation pattern radiates in both elevation and azimuth planes (e.g., horizontal and vertical planes) so that there is a greater degree of supported beam direction than the 2D beamforming.

A near-field and far-field boundary 205 may distinguish near-field from far-field in order to provide the appropriate beam weights, as well as to calibrate antenna parameters. Some tools and methods for determining the near-field and far-field boundary may involve antenna panels that are perpendicular to the propagation or alignment of antenna orientation. The techniques discussed herein provide a detection method to distinguish near-field and far-field based on measurements and without the antenna orientation. For example, the techniques disclose a method for determining whether a transmitter device is disposed in a near-field area or a far-field area relative to a receiver device. The techniques discussed herein may also provide a method to estimate the antenna orientation parameters.

To distinguish the near-field from the far-field, a first UE 115 (e.g., a receiver device) may determine the distance between the first UE 115 and a second UE 115 (e.g., a transmitter device), and the determined distance may be used to distinguish between the near-field and the far-field. To determine the distance, the first UE 115 may receive reference signals at a first antenna array of the first UE 115 from a second antenna array of the second UE 115. The first UE 115 may measure phases of the reference signals. Each of the phases may correspond to a respective antenna pair that includes a first antenna of the first antenna array and a second antenna of the second antenna array. An equation related to distance between two antennas of the different arrays includes first order (linear, to the power of 1) and second order (quadratic, to the power of 2) terms, which may be referred to as first order angle parameters and second order angle parameters respectively.

Based on phase measurements of the reference signals, linear regression or other analysis may be used to derive the first order angle parameters and second order angle parameters. If at least one of the second order angle parameters satisfies (e.g., is greater than) a threshold, then the first UE 115 may determine that the distance between the first UE 115 and the second UE 115 is a near-field distance (less than the far-field distance), and the first UE 115 may communicate with the second UE 115 accordingly. If none of the second order angle parameters satisfies (e.g., are greater than) the threshold, then the first UE 115 may determine that the distance between the first UE 115 and the second UE 115 is a far-field distance (greater than the far-field distance).

Figure 2:
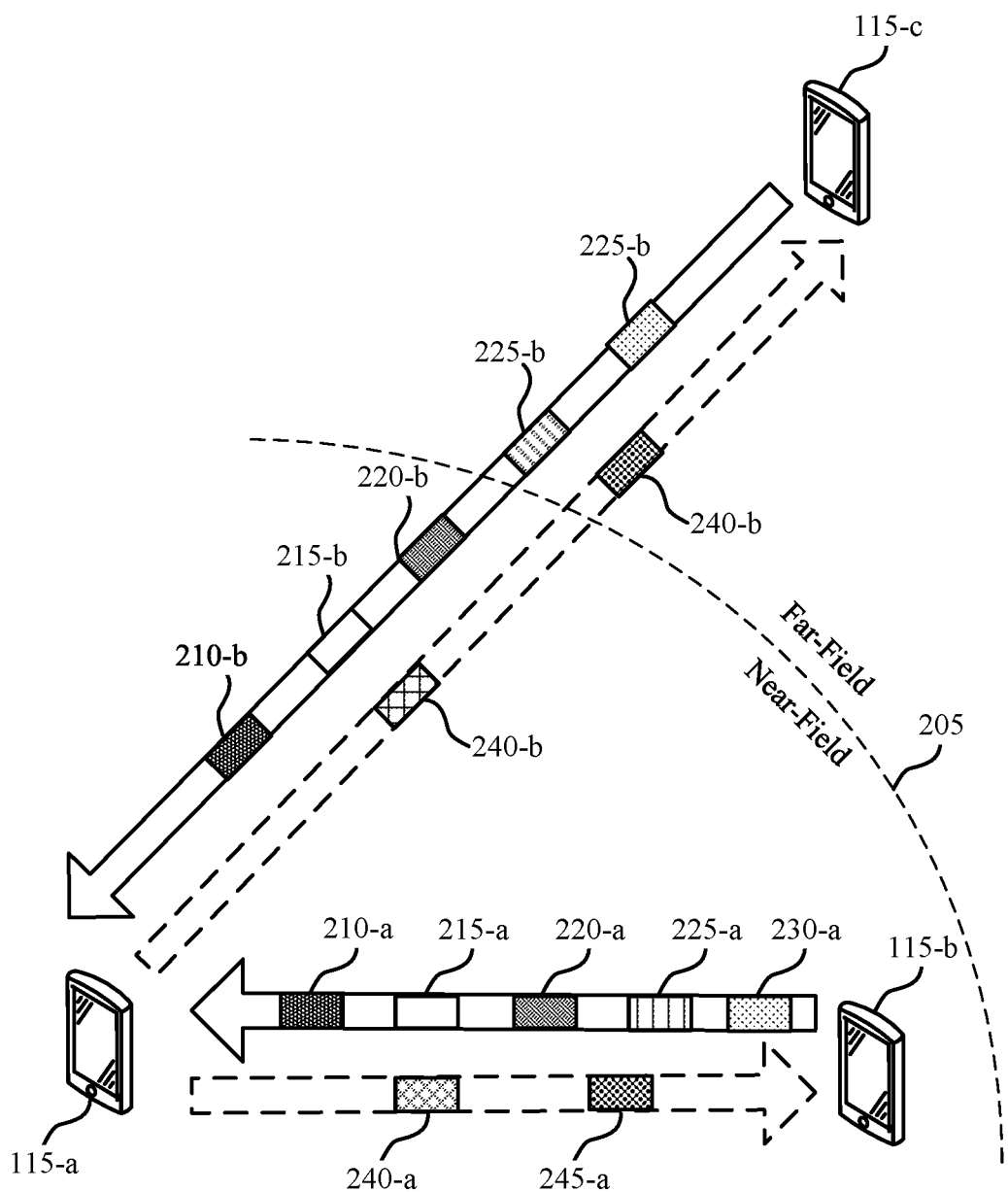
FIG. 2 shows an example of a wireless communications system that supports detection of near-field location for wireless communications in accordance with one or more aspects of the present disclosure.

FIG. 2 shows an example of a wireless communications system 200 that supports detection of near-field location for wireless communications in accordance with one or more aspects of the present disclosure. The wireless communications system 200 may implement aspects of or may be implemented by aspects of the wireless communications system 100. For example, the wireless communications system 200 includes a UE 115-a, a second UE 115-b, and a third UE 115-c, which may be examples of a UE 115 described with respect to FIG. 1. Although the communication techniques described herein are discussed with respect to sidelink control information (SCI), other data container may be used for communication, such as a MAC control element (MAC-CE) and the like.

In the wireless communication system 200, the first UE 115-a may communicate with the second UE 115-b and the third UE 115-c. The first UE 115-a may determine whether to communicate with the second UE 115-b and the third UE 115-c in accordance with near-field communications or far-field communications. For example, the first UE 115-a may transmit an indication of beam weights for MIMO based on whether the communication is in near-field or far-field. In some examples, the second UE 115-b is positioned in a near-field distance from the first UE 115-a while the third UE 115-c is positioned in a far-field distance from the first UE 115-a.

In some examples, the UEs 115 may communicate using sidelink communications. The first UE 115-a may receive a first sidelink control information (SCI) 210-a from the second UE 115-b and a second SCI 210-b from the third UE 115-c. The SCIs 210 may carry information that the receiving UE 115 uses in order to be able to receive and demodulate the physical sidelink shared channel (PSSCH), which carries sidelink data. In some examples, the UEs 115 may use inter-coordination, such as 3rd Generation Partnership Project (3GPP) Release 17 (Rel-17) inter-UE coordination framework to coordinate between the UEs 115 using the SCI 210-a and the SCI 210-b.

In some examples, the first UE 115 may receive a first set of reference signals 215-a from the second UE 115-b and a second set of reference signals 215-b from the third UE 115-c. The sets of reference signals 215 may be transmitted from antennas of respective antenna arrays of the second UE 115-b and the third UE 115-c. As will be discussed with respect to FIG. 5, the first UE 115-a may use the sets of reference signals 215 when determining whether the first UE 115 is in a near-field distance or a far-field distance from the second UE 115-b and the third UE 115-c.

The reference signals in each of the sets of reference signals 215 may be frequency division duplexed (FDM), time division duplexed (TDM), or both. As such, the reference signal from each antenna of each of the antenna arrays should be individually recognizable when received at the first UE 115-a. Accordingly, the first UE 115-a may receive an indication of a first set of unique identifiers (unique IDs or UIDs) 220-a from the second UE 115-b for each of the first set of reference signals 215-a. The first UE 115-a may also receive an indication of a second set of UIDs 220-b from the third UE 115-c for each of the second set of reference signals 215-b. The indication of the set of UIDs 220 may include multiple IDs indicative of individual antennas of a respective antenna array.

Figure 5:
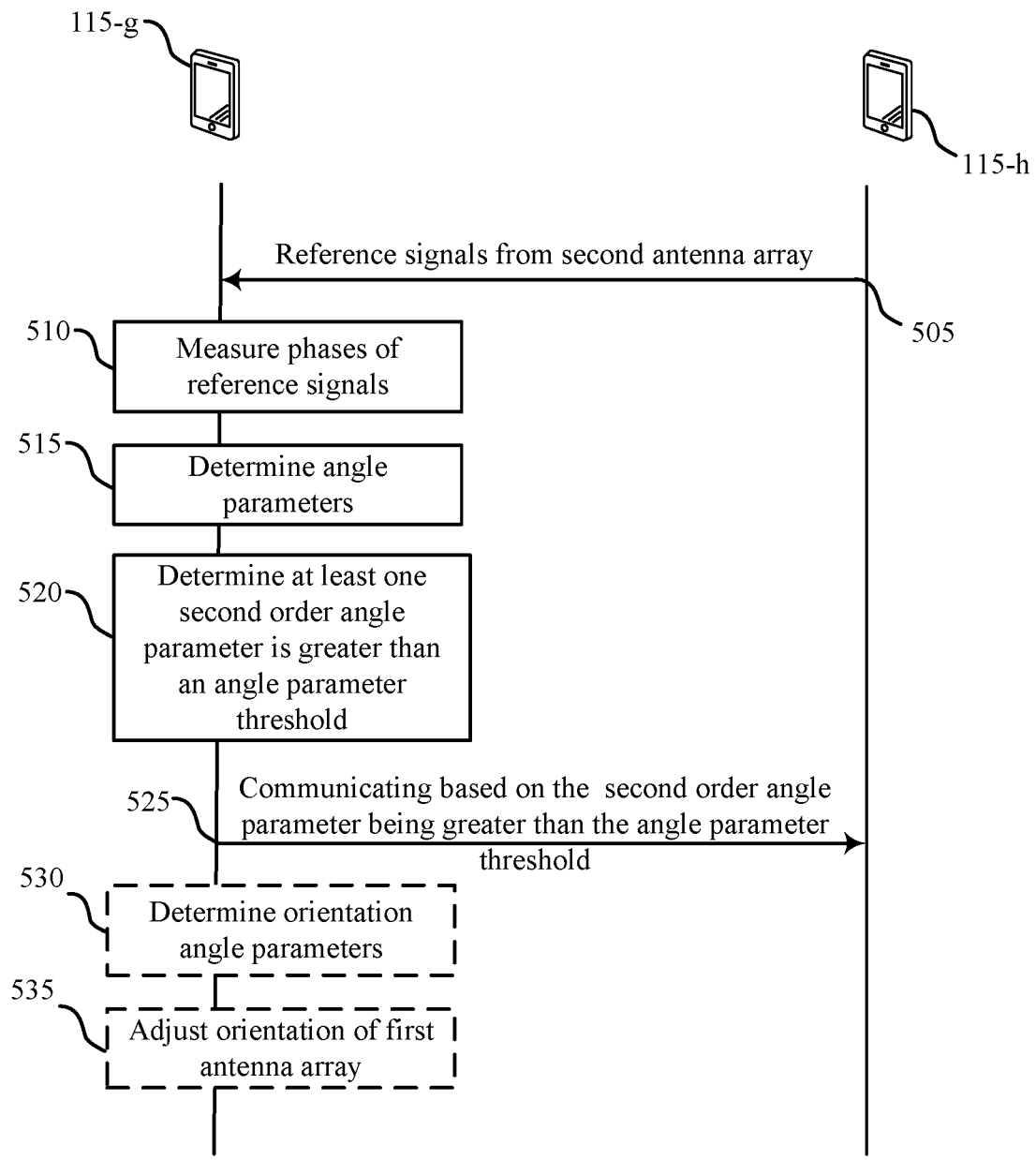
FIG. 5 shows an example of a process flow that supports detection of near-field location for wireless communications in accordance with one or more aspects of the present disclosure.

The first UE 115-a may use distance parameters, such as a center distance vector ($\vec{r}$), a receiver distance vector ($\vec{r}_R$), and a transmitter distance vector ($\vec{r}_T$), to determine whether the second UE 115-b or the third UE 115-c are in positioned in a near-field distance or a far-field distance relative to the first UE 115-a, as discussed with respect to FIG. 5. Accordingly, the first UE 115-a may receive an indication of a distance vector 225-a ($\vec{r}_T$) from the second UE 115-b and a distance vector 225-b ($\vec{r}_T$) from the third UE 115-c, and the first UE 115-a may receive an indication or know the $\vec{r}$ and $\vec{r}_R$. However, in some examples, the distance vectors 225 may not be used to detect near-field versus far-field if the first UE 115-a (receiver device) knows that the transmitter antennas of the second antenna array and the receiver antennas of the first antenna array are equally spaced, as discussed with respect to FIG. 5.

Accordingly, the first UE 115-a may receive a first indication of antenna spacing 230-a from the second UE 115-b and a second indication of antenna spacing 230-b. In some cases, the indication of antenna spacing 230 may indicate that the antennas of the respective antenna array are not equally spaced apart. In such cases, the first UE 115-a may still perform linear regression or other analysis to determine whether the second UE 115-b or the third UE 115-c are in a near-field distance or a far-field distance from the first UE 115-a based on the distance parameters, such as $\vec{r}$, $\vec{r}_R$, and $\vec{r}_T$. In some other cases, the first UE 115-a may still perform linear regression or other analysis to determine whether the second UE 115-b or the third UE 115-c are in a near-field distance or a far-field distance from the first UE 115-a based on an antenna placement pattern, which is the pattern by which the antennas are positioned in the antenna array (e.g., trend in the antenna placement). In some examples, the antenna placement pattern may be indicated to the first UE 115-a in the indications of antenna spacing 230.

After determining whether the second UE 115-b is disposed in near-field or a far-field with respect to the first UE 115-a, the first UE 115-a may transmit a first indication of field distance 240-a to the second UE 115-b (e.g., a near-field distance indication). Similarly, after determining whether the third UE 115-c is disposed in near-field or a far-field with respect to the first UE 115-a, the first UE 115-a may transmit a second indication of field distance 240-b to the third UE 115-c (e.g., a far-field distance indication). The first UE 115-a may transmit an indication of first beam weights 245-a to the to the second UE 115-b and an indication of second beam weights 245-b to the to the third UE 115-c. The weights in the indication of beam weights 245 may vary based on whether the second UE 115-b and third UE 115-c are in near-field distance or a far-field distance respect to the first UE 115-a.

Figure 3:
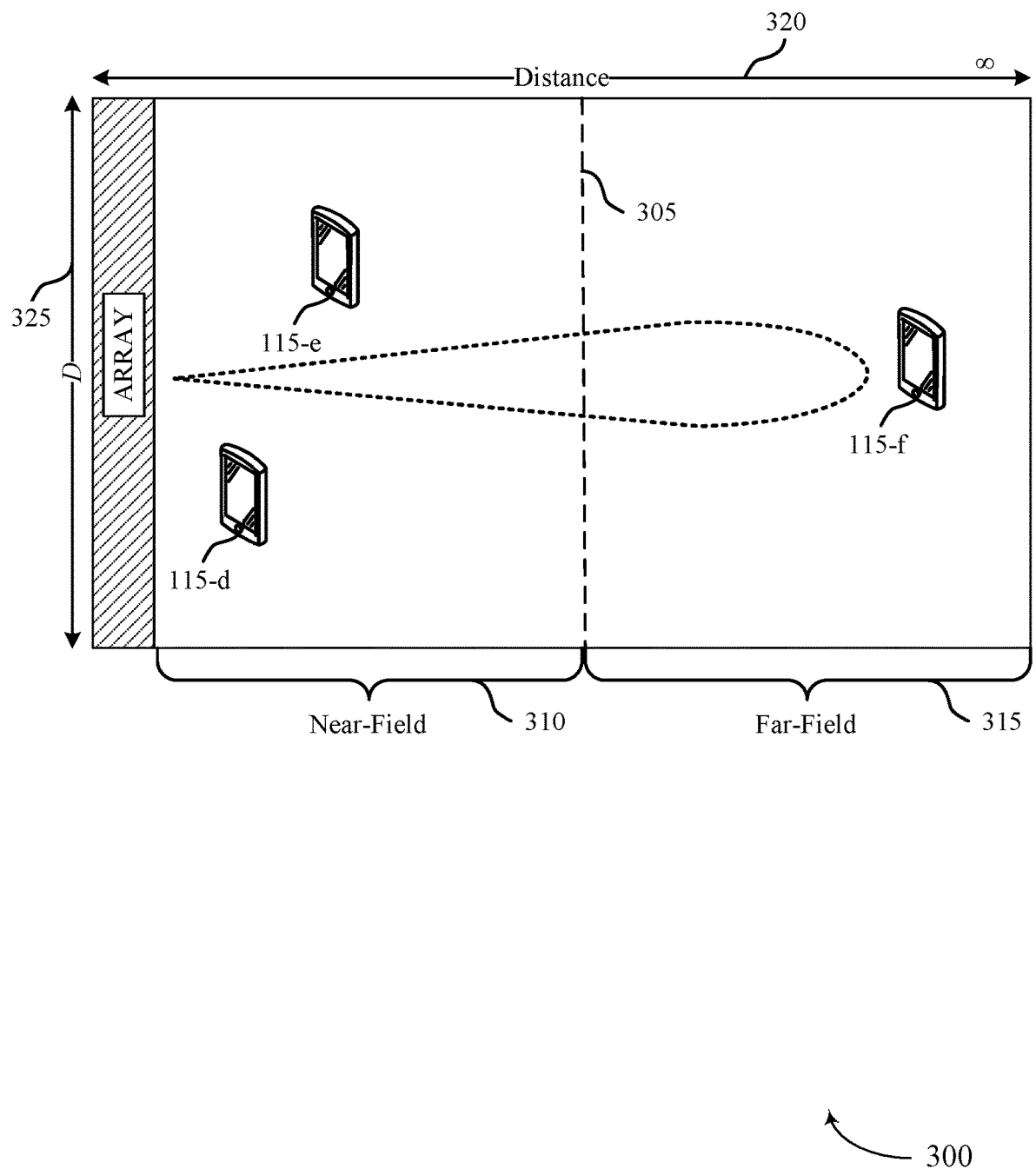
FIG. 3 shows an example of a near-field and far-field partition in accordance with one or more aspects of the present disclosure.

FIG. 3 shows an example of a near-field and far-field partition 300 in accordance with one or more aspects of the present disclosure. The near-field and far-field partition 300 may implement aspects of or may be implemented by aspects of the wireless communications system 100. For example, the near-field and far-field partition 300 includes a UE 115-d, a UE 115-e, and a UE 115-f, which may be examples of a UE 115 described with respect to FIG. 1.

Antennas of an antenna array 325 of a receiver device (e.g., UE 115-a of FIG. 2) may communicate with antenna arrays of the UE 115-d, the UE 115-e, and the UE 115-f that are located in a near-field or a far-field distance relative to the antenna array 325 of the receiver device. The partitioning distance between a near-field portion 310 and a far-field portion 315 in a distance 320 may depend on an antenna panel size (D) of the antenna array 325 of the receiver device and the wavelength (λ) of the signals communicated between the devices (e.g., wavelength of signals from UE 115-f communicating with the antenna array 325).

In some cases, the near-field portion 310 may be further divided into a reactive near-field and a radiating near-field. In such cases, the reactive near-field may include a distance of 0 (e.g., at the antenna array 325) to 0.62√(D^3/λ) and the radiating near-field may include a distance from 0.62√(D^3/λ) to 2D^2/λ. The far-field distance may include a distance from 2D^2/λ to infinity (∞). The radiating near-field may be equivalent to a Fresnel diffraction zone.

The exact division between near-field portion 310 and the far-field portion 315 may vary. For example, in some cases, a wireless communication system may be a high frequency wireless communication system (e.g., a 6G network), where the wavelengths are shorter and the antenna arrays 325 are larger with respect to lower frequency wireless communications systems (e.g., with respect to a 4G or 5G network). As the wavelength decreases, the coverage area of the near-field portion 310 may increase, varying a boundary 305. In some examples, the boundary 305 between the near-field portion 310 and the far-field portion 315 in the distance 320 may be estimated as D^2/λ.

In some examples, the near-field and far-field partition 300 may be used for holographic MIMO (H-MIMO). The H-MIMO may be viewed as a large array of transmitters and receivers. In some examples, H-MIMO may be viewed as a combination of a signal source and optical lens, or as an ultimate electronic lens where amplitude and phase are both adjustable. H-MIMO may generate both 2D and 3D beams and the receiver device may distinguish them. The techniques discussed herein provide how the receiver may distinguish 2D (e.g., far-field) and 3D (e.g., near-field) based on reference signals. Near-field operations may be important in 6G due to multiple antenna operations in higher carrier frequencies (e.g., FR4, sub-THz, etc.), as well as the use of larger antenna arrays (e.g., with respect to antenna arrays used for 4G and 5G). Thus, the near-field may vary and may not be "near" with respect to antenna array 325 of the receiver device based on the array size, operating frequency, or both. In some examples, the far-field distance may be up to 2.56 meters (m) with a 32×1 antenna array, 10.24 m with a 64×1 antenna array, and a 2.6 kilometer (km) with a 1024×1 antenna array, at 30 GHz. For an aperture of 1 m, the far-field distance at 30 GHz may be 100 m and the far-field distance at 120 GHz may be 400 m.

Figure 4A:
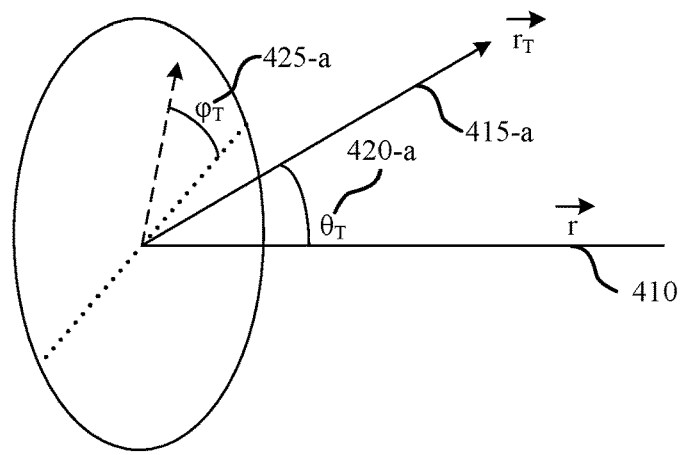
FIG. 4A shows an example of a sphere coordinate diagram for angular parameters associated with a transmitter device that supports detection of near-field location for wireless communications in accordance with one or more aspects of the present disclosure.

FIG. 4A shows an example of a sphere coordinate diagram 400-a for angular parameters associated with a transmitter device that supports detection of near-field location for wireless communications in accordance with one or more aspects of the present disclosure. The sphere coordinate diagram 400-a may correspond to an antenna array of a transmitter device (e.g., UE 115-b or UE 115-c of FIG. 2). The center of the transmitter antenna array and center of a receiver antenna array may be separated by a center distance vector, $\vec{r}$ 410. If the transmitter distance vector, $\vec{r}_T$ 415-a, refers to a distance between a transmitter antenna of the transmitter antenna array with respect to the center of the transmitter antenna array, and a receiver distance vector $\vec{r}_R$ refers to a distance between a receiver antenna of a receiver antenna array with respect to the center of the receiver antenna array, then the distance between the transmitter antenna and the receiver antenna may be calculated based on the following equation:

$$d = |\vec{r} + \vec{r}_R - \vec{r}_T| \approx r\left\{1 + \frac{r_R}{r}\cos\theta_R - \frac{r_T}{r}\cos\theta_T + \frac{1}{2}\left(\frac{r_R}{r}\right)^2\sin^2\theta_R + \frac{1}{2}\left(\frac{r_T}{r}\right)^2\sin^2\theta_T - \frac{r_R r_T}{r^2}[\cos\theta_R\cos\theta_T + \sin\theta_R\sin\theta_T\cos(\varphi_T - \varphi_R)]\right\}$$

where d refers to the distance between the transmitter antenna and the receiver antenna, $\vec{r}$ 410 refers to the center distance vector corresponding to the distance between the center of the transmitter antenna array and the center of the receiver antenna array, $\vec{r}_R$ refers to the receiver distance vector, $\vec{r}_T$ 415-a refers to the transmitter distance vector, $\theta_T$ 420-a refers to a transmitter polar angle, $\varphi_T$ 425-a refers to a transmitter azimuth angle, $\theta_R$ refers to a receiver polar angle, and $\varphi_R$ refers to a receiver azimuth angle. In some examples, $\vec{r}$ 410, $\vec{r}_T$ 415-a, and $\vec{r}_R$ 415b, represent the magnitudes of the respective vectors (indicated by the arrow above the r in each term). The angular parameters, $\theta_T$, $\varphi_T$, $\theta_R$, $\varphi_R$, are defined as angles in a sphere coordinate with $\vec{r}$ 410 as the z-axis.

The transmitter device (e.g., UE 115-b or UE 115-c of FIG. 2) has knowledge of the transmitter antenna array including the quantity and placement of antennas, as well as the center (or may define the center) of the transmitter antenna array. The receiver device has knowledge of the receiver antenna array including the quantity and placement of antennas, as well as the center (or may define the center) of the receiver antenna array. Accordingly, applying these parameters to the sphere coordinate diagram 400-*a* (e.g., x-y-z coordinate system) and then converting to polar coordinates, provides the equation for calculating d. As will be discussed herein, linear regression is one example form of analysis that may be applied to determine angle parameters, which include both first order angle parameters (linear parameters) and second order angle parameters (quadratic parameters). The first order angle parameters and the second order angle parameters may be used to ultimately determine whether the transmitter wireless device and the receiver wireless device (via the transmitter antenna and the receiver antenna) are separated by a near-field distance or a far-field distance.

The first order angle parameters include $$\frac{r_R}{r},$$

and $$\left(\frac{r_T}{r}\right)^2, \left(\frac{r_R}{r}\right)^2 \text{ and } \frac{r_R r_T}{r^2}.$$

and the second order angle parameters include $$\frac{r_T}{r}$$

Note that the second order angle parameters include the cross term $$\frac{r_R r_T}{r^2}.$$

In some examples, a receiver distance, $r_R$, is relatively much less than a center distance, r, and a transmitter distance, $r_T$, which is relatively much less than r (e.g., $r_R \ll r$, $r_T \ll r$), so that the second order angle parameters are relatively much less than the first order angle parameters (e.g., second order angle parameters << first order angle parameters), except when the particular angle results in small first order angle parameters. A confidence interval may be calculated using linear regression, and the confidence interval may be used to check whether the threshold for the second order angle parameters is reliable (e.g., if an approximately zero or non-zero decision is reliable or not). In some examples, joint linear regression for the first order angle parameters and the second order angle parameters may be combined and may be executed without consideration of the relationship among other parameters in the equation. In some examples, the absence of any restriction on $\theta_T$ 420-*a* and $\theta_R$ 420-*b* results in no obligation on alignment between the transmitter antennas and the receiver antennas. By estimating the orientation parameters (e.g., $\theta_T$, $\varphi_T$, $\theta_R$, $\varphi_R$), the distance, r, may be further estimated to check against a selected far-field threshold (e.g., threshold equal to or greater than $2D^2/\lambda$). Distance and orientation determinations may be used for antenna positioning measurement, as well as for positioning adjustments.

For reference, the value of d may also correspond to $$d = |\vec{r} + \vec{r}_R - \vec{r}_T| =$$

$$|r\vec{e_r} + r_R\vec{e_R} - r_T\vec{e_T}| = r\left|\vec{e_r} + \frac{r_R}{r}\vec{e_R} - \frac{r_T}{r}\vec{e_T}\right| = r\sqrt{\left(\vec{e_r} + \frac{r_R}{r}\vec{e_R} - \frac{r_T}{r}\vec{e_T}\right)^2} =$$

$$r\sqrt{1 + \frac{2r_R}{r}\vec{e_r}\cdot\vec{e_R} - \frac{2r_T}{r}\vec{e_r}\cdot\vec{e_T} + \left(\frac{r_R}{r}\right)^2 + \left(\frac{r_T}{r}\right)^2 - \frac{2r_R r_T}{r^2}\vec{e_R}\cdot\vec{e_T}} =$$

$$1 + \frac{r_R}{r}\vec{e_r}\cdot\vec{e_R} - \frac{r_T}{r}\vec{e_r}\cdot\vec{e_T} + \frac{1}{2}\left(\frac{r_R}{r}\right)^2 + \frac{1}{2}\left(\frac{r_T}{r}\right)^2 -$$

$$\frac{r_R r_T}{r^2}\vec{e_R}\cdot\vec{e_T} - \frac{1}{8}\left(\frac{2r_R}{r}\right)^2|\vec{e_r}\cdot\vec{e_R}|^2 - \frac{1}{8}\left(\frac{2r_T}{r}\right)^2|\vec{e_r}\cdot\vec{e_T}|^2 +$$

$$o\left(\left(\frac{r_R}{r}\right)^2, \frac{1}{2}\left(\frac{r_R}{r}\right)^2, \frac{r_R r_T}{r^2}\right) = 1 + \frac{r_R}{r}\vec{e_r}\cdot\vec{e_R} - \frac{r_T}{r}\vec{e_r}\cdot\vec{e_T} +$$

$$\frac{1}{2}\left(\frac{r_R}{r}\right)^2(1 - |\vec{e_r}\cdot\vec{e_R}|^2) + \frac{1}{2}\left(\frac{r_T}{r}\right)^2(1 - |\vec{e_r}\cdot\vec{e_T}|^2) - \frac{r_R r_T}{r^2}\vec{e_R}\cdot\vec{e_T}.$$

Additionally, for reference, if $\vec{r}$ 410 is applied to a z-axis, namely, $$\vec{r} = (0, 0, 1), \text{ then } r_T = (\sin\theta_T\cos\varphi_T, \sin\theta_T\sin\varphi_T, \cos\theta_T) \text{ and}$$

$$r_R = (\sin\theta_R\cos\varphi_R, \sin\theta_R\sin\varphi_R, \cos\theta_R) \text{ and}$$

$$d \approx 1 + \frac{r_R}{r}\vec{e_r}\cdot\vec{e_R} - \frac{r_T}{r}\vec{e_r}\cdot\vec{e_T} +$$

$$\frac{1}{2}\left(\frac{r_R}{r}\right)^2(1 - |\vec{e_r}\cdot\vec{e_R}|^2) + \frac{1}{2}\left(\frac{r_T}{r}\right)^2(1 - |\vec{e_r}\cdot\vec{e_T}|^2) - \frac{r_R r_T}{r^2}\vec{e_R}\cdot\vec{e_T} =$$

$$1 + \frac{r_R}{r}\cos\theta_R - \frac{r_T}{r}\cos\theta_T + \frac{1}{2}\left(\frac{r_R}{r}\right)^2(1 - \cos^2\theta_R) + \frac{1}{2}\left(\frac{r_T}{r}\right)^2(1 - \cos^2\theta_T) -$$

$$\frac{r_R r_T}{r^2}[\cos\theta_R\cos\theta_T + \sin\theta_R\sin\theta_T\cos(\varphi_T - \varphi_R)] =$$

$$1 + \frac{r_R}{r}\cos\theta_R - \frac{r_T}{r}\cos\theta_T + \frac{1}{2}\left(\frac{r_R}{r}\right)^2\sin^2\theta_R + \frac{1}{2}\left(\frac{r_T}{r}\right)^2\sin^2\theta_T -$$

$$\frac{r_R r_T}{r^2}[\cos\theta_R\cos\theta_T + \sin\theta_R\sin\theta_T\cos(\varphi_T - \varphi_R)].$$

Here $\vec{e_r}$ is the unit vector in the direction from the center of the receiver antenna array to the receiver antenna, $\vec{e_T}$ is the unit vector in the direction from the center of the transmitter antenna array to the transmitter antenna, and $\vec{e_R}$ is the unit vector in the direction from the center of the receiver antenna array to the center of transmitter antenna array.

In some cases, multiple terms within an equation for d may be determined or estimated together. For example, cos $\theta_T$ may be estimated rather than determining the actual value of $\theta_T$ 415-*a*. In some examples, the value of the individual terms (e.g., $\theta_T$ 415-*a*) may be derived using linear regression based on the estimation of product of multiple terms (e.g., cos $\theta_T$). The values of the induvial terms, such as $\theta_T$ 415-*a*, may be used to adjust the orientation of the antennas.

As will be discussed with respect to FIG. 5, the first order angle parameters and the second order angle parameters may be determined based on phases of reference signals. The receiver device may determine that the transmitter device is in a near-field distance with respect to the receiver device when at least one of the second order angle parameters is greater than a zero. Indeed, all three of the second order angle parameters may not be less than the threshold (e.g., approximately zero, zero, or a different threshold). If $\sin^2\theta_R=0$, and $\sin^2\theta_T=0$, then $\cos\theta_R\cos\theta_T+\sin\theta_R\sin\theta_T\cos(\varphi_T-\varphi_R)=1$. It is possible that both coefficients for transmitter device $\sin^2 \theta_T=0$ and $[\cos \theta_R \cos \theta_T+\sin \theta_R \sin \theta_T \cos(\varphi_T-\varphi_R)]=0$, which may occur when $\theta_T=0$, and $$\theta_R = \frac{\pi}{2}.$$

It is also possible that both coefficients for the receiver device $\sin^2 \theta_R=0$ and $[\cos \theta_R \cos \theta_T+\sin \theta_R \sin \theta_T \cos(\varphi_T-\varphi_R)]=0$, which may occur when $\theta_R=0$, and $$\theta_T = \frac{\pi}{2}.$$

Accordingly, if the receiver device is in the near-field relative to the transmitter device, then at least one of the three second order angle parameters will be greater than the angle parameter threshold (e.g., decision criteria for near-field).

Figure 4B:
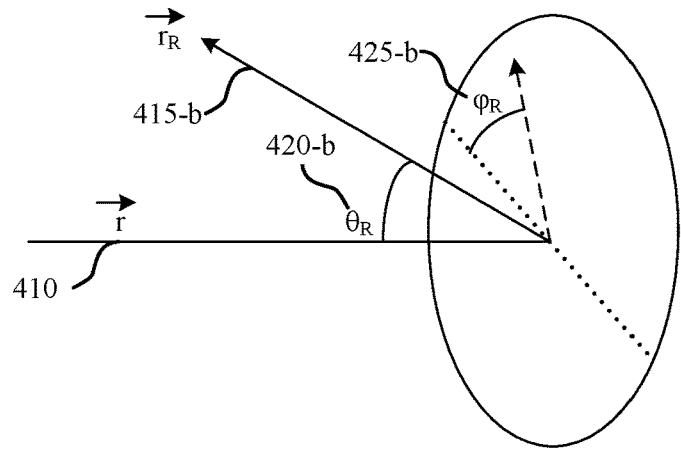
FIG. 4B shows an example of a sphere coordinate diagram for angular parameters associated with a receiver device that supports detection of near-field location for wireless communications in accordance with one or more aspects of the present disclosure.

FIG. 4B shows an example of a sphere coordinate diagram 400-b for angular parameters associated with a receiver device that supports detection of near-field location for wireless communications in accordance with one or more aspects of the present disclosure. The sphere coordinate diagram 400-b may correspond to an antenna array of a receiver device (e.g., UE 115-a of FIG. 2). The center of the receiver antenna array and center of a transmitter antenna array may be separated by the vector center distance, $\vec{r}$ 410. The $\vec{r}_T$ 415-a may refer to a distance between a transmitter antenna of the transmitter antenna array with respect to the center of the receiver antenna array (e.g., UE 115-a of FIG. 1), and may be used to determine the distance between the transmitter antenna and the receiver antenna as discussed with respect to FIG. 4A. For example, $\vec{r}$ 410 refers to the center distance vector, $\vec{r}_R$ 415-b refers to the receiver distance vector, $\vec{r}_T$ 415-a refers to the transmitter distance vector, $\theta_T$ 420-a refers to a transmitter polar angle, $\varphi_T$ 425-a refers to a transmitter azimuth angle, $\theta_R$ 420-b refers to a receiver polar angle, and $\varphi_R$ 425-b refers to a receiver azimuth angle. These parameters may be determined as discussed with respect to FIG. 4A.

Figure 4C:
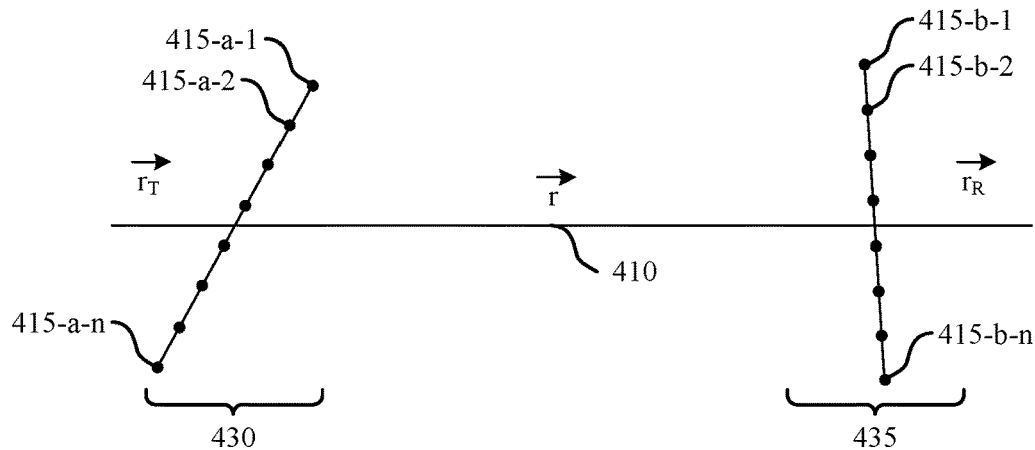
FIG. 4C shows an example of a communications environment that supports detection of near-field location for wireless communications in accordance with one or more aspects of the present disclosure.

FIG. 4C shows an example of a communications environment 400-c that supports detection of near-field location for wireless communications in accordance with one or more aspects of the present disclosure. The communications environment 400-c illustrates a receiver antenna array 435 having multiple receiver antennas each corresponding to a respective receiver distance vector, $\vec{r}_R$ 415-b (e.g., a first receiver antenna corresponding to a first receiver distance vector $\vec{r}_R$ 415-b-1, a second receiver antenna corresponding to a second receiver distance vector $\vec{r}_R$ 415-b-2, and so on, to 415-b-n, where n can be any quantity). The communications environment 400-c also illustrates a transmitter antenna array 430 having multiple transmitter antennas each corresponding to a respective transmitter distance vector, $\vec{r}_T$ 415-a (e.g., a first transmitter antenna corresponding to a first transmitter distance vector $\vec{r}_T$ 415-a-1, a second transmitter antenna corresponding to a second transmitter distance vector $\vec{r}_T$ 415-a-2, and so on, to 415-a-n, where n can be any quantity). The center of the receiver antenna array 435 is separated from the center of the transmitter antenna array 430 by the center distance vector, $\vec{r}$ 410.

As will be discussed with respect to FIG. 5, the transmitter antennas of the transmitter antenna array 430 may transmit reference signals to the receiver antennas of the receiver antenna array 435 in transmitter antenna-receiver antenna pairs. The receiver wireless device that includes the receiver antenna array 435 may determine phases of the reference signals to determine the first and second order angle parameters, and thus, to determine whether the transmitter wireless device that includes the transmitter antenna array 430 is in a far-field distance or near-field distance from the receiver wireless device.

The multiple transmitter antennas of the transmitter antenna array 430 may have different $r_T$ 415-a-1 vectors but the same $\theta_T$ 420-a, and the multiple receiver antennas of the receiver antenna array 435 may have different $r_R$ 415-b vectors but the same $\theta_R$ 420-b. Based on phase measurements of the reference signals from the transmitter antennas, the receiver wireless device may determine the linear, first order angle parameters, including $\cos \theta_T$, $\cos \theta_R$, as well as the second order angle parameters, including $\sin^2 \theta_T$, $\sin^2 \theta_R$, $\cos \theta_R \cos \theta_T+\sin \theta_R \sin \theta_T \cos(\varphi_T-\varphi_R)$. These parameters may be calculated based on linear regression of observed phases against different values of $r_T$, $r_R$ and the derived parameters of $r_T^2$, $r_R$ and $r_T r_R$. Any ambiguities in the phase measurements may be removed if the transmitter antennas and the receiver antennas are dense enough (e.g., quantity of transmitter antennas in the antenna array panel or the receiver antennas in the receiver antenna array panel are above a threshold quantity of antennas, antennas are positioned no more than half wavelength away). If any of the three second order angle parameters are above the angle parameter threshold, then the receiver wireless device may determine that the receiver is in the near-field relative to the transmitter wireless device. On the other hand, if none of the three second order angle parameters are above the angle parameter threshold, then the receiver wireless device may determine that the receiver is in the far-field relative to the receiver wireless device.

In some examples, the angle parameter threshold may be zero. In other examples, the angle parameter threshold may be a non-zero value that is statistically significant for the corresponding angle parameter (e.g., the angle parameter threshold may be some multiple of the standard deviation for the angle parameter or some multiple of a statistical variance of the angle parameter). For example, if one of the determined second order angle parameters is greater than double (2×) the standard deviation for that parameter, or if a square of one of the determined second order angle parameters is greater than quadruple (4×) the statistical variance for that parameter, then the second order angle parameter may be determined to satisfy the angle parameter threshold. The $\theta_T$ 420-a and $\theta_R$ 420-b may be reliably estimated based on the second order angle parameter determinations. In some examples, the estimation of the linear, first order angle parameters may not be reliable without consideration of the second order angle parameters (e.g., first order angle parameters are based on the second order angle parameters).

The reference signals are transmitted from multiple transmitter antennas, forming the line passing through the center of the receiver antenna array 435. As previously discussed, the reference signal from each transmitter antenna may be individually recognizable since multiple reference signals may be FDM, TDM, or both, when the reference signals arrive at the receiver antenna array 435. The multiple receiver antennas may be activated to receive the multiple reference signals from the multiple transmitters. Each of the receiver antennas of the receiver antenna array 435 may be used by the receiver wireless device to estimate the phase of the received reference signal from the respective transmitter antenna. Calculating the first order angle parameters and the second order angle parameters may be based on the phase measurement of each transmitter antenna-receiver antenna pair (e.g., antenna pairs that each comprise a respective first antenna of the first antenna array and a respective second antenna of the second antenna array). These multiple reference transmitter antenna-receiver antenna array configurations may be implemented to improve the accuracy of the estimated angle parameters.

In some examples, linear regression may be performed on the measured phases of the reference signals to facilitate determining the first order angle parameters and the second order angle parameters. Phase measurements may be performed for each of the transmitter antenna-receiver antenna pairs, for example, for $m^{th}$ transmitter antenna and $n^{th}$ receiver antenna ($\lambda$ as wavelength). For example, $$\text{phase}(m, n) = 2*\pi*\frac{d(m,n)}{\lambda} = 2*\frac{\pi}{\lambda}*|\vec{r}+\vec{r}_{R(n)}-\vec{r}_{T(m)}| \approx$$

$$2*\frac{\pi r}{\lambda}\left\{1 + \frac{r_{R(n)}}{r}\cos\theta_R - \frac{r_{T(m)}}{r}\cos\theta_T + \frac{1}{2}\left(\frac{r_{R(n)}}{r}\right)^2\sin^2\theta_R + \frac{1}{2}\left(\frac{r_{T(n)}}{r}\right)^2\sin^2\theta_T - \frac{r_{R(n)}r_{T(m)}}{r^2}[\cos\theta_R\cos\theta_T + \sin\theta_R\sin\theta_T\cos(\varphi_T - \varphi_R)]\right\}.$$

Linear regression may be applied to the phase(m, n) as a function of $r_{T(m)}$, $r_{T(n)}$, $r_{T(m)}^2$, $r_{R(n)}^2$, and $r_{T(m)}r_{T(n)}$, by arranging the following exemplary matrix representation:

$$\begin{bmatrix} \text{Phase}(1,1) \\ \cdots \\ \text{Phase}(1,n) \\ \text{Phase}(2,1) \\ \cdots \\ \text{Phase}(2,n) \\ \cdots \\ \cdots \\ \text{Phase}(m,1) \\ \cdots \\ \text{Phase}(m,n) \end{bmatrix} = \begin{bmatrix} r_{T(1)} & r_{R(1)} & r_{T(1)}^2 & r_{R(1)}^2 & r_{T(1)}r_{R(1)} \\ & & \cdots & & \\ r_{T(1)} & r_{R(n)} & r_{T(1)}^2 & r_{R(n)}^2 & r_{T(1)}r_{R(n)} \\ r_{T(2)} & r_{R(1)} & r_{T(2)}^2 & r_{R(1)}^2 & r_{T(2)}r_{R(1)} \\ & & \cdots & & \\ r_{T(2)} & r_{R(n)} & r_{T(2)}^2 & r_{R(n)}^2 & r_{T(2)}r_{R(n)} \\ & & \cdots & & \\ & & \cdots & & \\ r_{T(m)} & r_{R(1)} & r_{T(m)}^2 & r_{R(1)}^2 & r_{T(m)}r_{R(1)} \\ & & \cdots & & \\ r_{T(m)} & r_{R(n)} & r_{T(m)}^2 & r_{R(n)}^2 & r_{T(m)}r_{R(n)} \end{bmatrix}\begin{bmatrix} C_T \\ C_R \\ C_{T^2} \\ C_{R^2} \\ C_{T,R} \end{bmatrix} +$$

$$\text{common offset} + \begin{bmatrix} \text{Error}(1,1) \\ \cdots \\ \text{Error}(1,n) \\ \text{Error}(2,1) \\ \cdots \\ \text{Error}(2,n) \\ \cdots \\ \cdots \\ \text{Error}(m,1) \\ \cdots \\ \text{Error}(m,n) \end{bmatrix}$$

where coefficients, C, may be based on the following:

$$C_T \sim \frac{\cos\theta_T}{r}, C_R \sim \frac{\cos\theta_R}{r},$$

(these two coefficients may be viewed as beam direction indictors and are the first order angle coefficients, which may be referred to as first order angle parameters) and $$C_{T^2} \sim \left(\frac{1}{r}\right)^2\sin^2\theta_T,$$

$$C_{R^2} \sim \left(\frac{1}{r}\right)^2\sin^2\theta_R,$$

$$C_{T,R} \sim \frac{[\cos\theta_R\cos\theta_T + \sin\theta_R\sin\theta_T\cos(\varphi_T - \varphi_R)]}{r^2}$$

(these three coefficients are related to curvature in the spherical wave and are the second order angle coefficients, which may be referred to as second order angle parameters), or in another form:

$$\begin{bmatrix} \text{Phase}(1,1) \\ \cdots \\ \text{Phase}(1,n) \\ \text{Phase}(2,1) \\ \cdots \\ \text{Phase}(2,n) \\ \cdots \\ \cdots \\ \text{Phase}(m,1) \\ \cdots \\ \text{Phase}(m,n) \end{bmatrix} = \begin{bmatrix} r_{T(1)} & r_{R(1)} & r_{T(1)}^2 & r_{R(1)}^2 & r_{T(1)}r_{R(1)} & 1 \\ & & \cdots & & & \\ r_{T(1)} & r_{R(n)} & r_{T(1)}^2 & r_{R(n)}^2 & r_{T(1)}r_{R(n)} & 1 \\ r_{T(2)} & r_{R(1)} & r_{T(2)}^2 & r_{R(1)}^2 & r_{T(2)}r_{R(1)} & 1 \\ & & \cdots & & & \\ r_{T(2)} & r_{R(n)} & r_{T(2)}^2 & r_{R(n)}^2 & r_{T(2)}r_{R(n)} & 1 \\ & & \cdots & & & \\ & & \cdots & & & \\ r_{T(m)} & r_{R(1)} & r_{T(m)}^2 & r_{R(1)}^2 & r_{T(m)}r_{R(1)} & 1 \\ & & \cdots & & & \\ r_{T(m)} & r_{R(n)} & r_{T(m)}^2 & r_{R(n)}^2 & r_{T(m)}r_{R(n)} & 1 \end{bmatrix}\begin{bmatrix} C_T \\ C_R \\ C_{T^2} \\ C_{R^2} \\ C_{T,R} \\ \text{offset} \end{bmatrix} +$$

$$\begin{bmatrix} \text{Error}(1,1) \\ \cdots \\ \text{Error}(1,n) \\ \text{Error}(2,1) \\ \cdots \\ \text{Error}(2,n) \\ \cdots \\ \text{Error}(m,1) \\ \cdots \\ \text{Error}(m,n) \end{bmatrix}$$

The common offset and errors (Error) may refer to residual errors after fitting the best estimated parameter to known observations (e.g., known or measured phases and distances). In some examples, the common offset and errors may be used for linear regression. In this matrix form, when P=RC+e, where P is the phase matrix above, R is the r-vector matrix above, C is the coefficient matrix above, and e is the error matrix above, then the estimated parameters (based on least square) may be expressed as: $\hat{C}=(R^H R)^{-1}R^H P$, covariance matrix is $\sigma^2(R^H R)^{-1}$, with $\sigma^2$ as the variance of measurement error.

FIG. 5 shows an example of a process flow 500 that supports detection of near-field location for wireless communications in accordance with one or more aspects of the present disclosure. The process flow 500 may implement aspects of or may be implemented by aspects of the wireless communications system 100 or the wireless communications system 200. For example, the process flow 500 may include a UE 115-*g* and a UE 115-*h*, which may be examples of a UE 115 as described herein. In the following description of the process flow 500, the operations performed by the UE 115-*g* and 115-*h* may be performed in different orders or at different times than the exemplary order shown. Some operations may also be omitted from the process flow 500, or other operations may be added to the process flow 500. Further, while operations in the process flow 500 are illustrated as being performed by the UE 115-g and the UE 115-h, the examples herein are not to be construed as limiting, as the described features may be associated with any quantity of different devices.

At 505, the UE 115-g may receive, at a first antenna array of the UE 115-g, multiple reference signals from a second antenna array of a second wireless device, UE 115-h. At 510, the UE 115-g may measure multiple phases of the multiple of reference signals. The multiple phases correspond to respective antenna pairs that each include a respective first antenna of the first antenna array and a respective second antenna of the second antenna array.

At 515, the UE 115-g may determine, based on the multiple phases, multiple angle parameters. The multiple angle parameters may include multiple first order angle parameters and multiple second order angle parameters. The multiple first order angle parameters may include linear terms associated with a distance between a first antenna of the first antenna array and a center of the first antenna array or another distance between a second antenna of the second antenna array and a center of the second antenna array. The multiple second order angle parameters may include quadratic terms associated with the distance between the first antenna of the first antenna array and the center of the first antenna array or the distance between the second antenna of the second antenna array and the center of the second antenna array.

In some examples, the UE 115-g may receive an indication of a second distance vector for the second antenna array, where the second distance vector includes distances between respective antennas of the second antenna array and the center of the second antenna array. In such examples, determining the multiple first order angle parameters and the multiple second order angle parameters may be determined using the second distance vector and a first distance vector for the first antenna array (e.g., based on linear regression or another type of analysis). The first distance vector may include distances between respective antennas of the first antenna array and the center of the first antenna array.

In some examples, the UE 115-g may receive an indication of a spacing between antennas of the second antenna array. In such examples, determining the multiple first order angle parameters and the multiple second order angle parameters may further be based on a mapping between respective antenna indices for antennas of the first antenna array and respective distances from the center of the second antenna array (e.g., using linear regression or another type of analysis).

At 520, the UE 115-g may determine that at least one second order angle parameter of the multiple second order angle parameters satisfies (e.g., is greater than) an angle parameter threshold. In some examples, determining that at least one of the multiple second order angle parameters satisfies the angle parameter threshold further includes determining that a second order angle parameter has a magnitude that is greater than the angle parameter threshold, where the angle parameter threshold is based on a standard deviation associated with the second order angle parameter. In some examples, determining that at least one of the multiple second order angle parameters is greater than the angle parameter threshold includes determining that a square of a second order angle parameter is greater than the angle parameter threshold, where the angle parameter threshold is based at least in part on a statistical variance associated with the second order angle parameter.

In some examples, determining the multiple first order angle parameters may be based on determining the multiple second order angle parameters.

At 525, the UE 115-g may communicate with the second wireless device, UE 115-h, based on the determination that at least of one of the multiple second order angle parameters satisfies the angle parameter threshold. In some examples, the UE 115-g may also transmit, to the second wireless device, an indication of whether the first wireless device, UE 115-g, is disposed in a near-field communication distance or in a far-field communication distance from the second wireless device (e.g., if at least of one of the multiple second order angle parameters satisfies the angle parameter threshold, then the UE 115-g may determine that it is within the near-field communication distance relative to the second wireless device and thus may send an indication of being disposed within the near-field; if none of the multiple second order angle parameters satisfies the angle parameter threshold, then the UE 115-g may determine that it not is within the near-field communication distance and thus may send an indication of being disposed within the far-field). In some examples, the indication may include an indication of beam weights to be applied to the multiple reference signals. The beam weights may be based on whether the first wireless device, UE 115-g, is disposed in the near-field communication distance or the far-field communication distance from the second wireless device.

In some examples, at 530, the UE 115-g may determine a first orientation angle parameter associated with the first wireless device and a second orientation angle parameter associated with the second wireless device. The first orientation angle parameter and the second orientation angle parameter may be based on the multiple second order angle parameters. In some examples, at 535, the UE 115-g may adjust orientation of the first antenna array based on the first orientation angle parameter, the second orientation angle parameter, or both. In some examples, when none of the second plurality of second order angle parameters are greater than the angle parameter threshold, the UE 115-g may communicate with the second wireless based on the second order angle parameters being less than the angle parameter threshold. In such examples, the UE 115-g may communicate in accordance with a far-field protocol. Moreover, in some examples, the UE 115-g may receive a UID associated with each of the multiple reference signals, where the multiple reference signals are FDM, TDM, or both.

In some examples, for orientation parameter estimation, the receiver wireless device, UE 115-g (e.g., the first wireless device), may receive an indication of or know certain geometric size parameters. For example, the $r_T$ for the multiple transmitter antennas may be conveyed to the receiver wireless device. The $r_R$ for the multiple receiver antennas may be known to the receiver wireless device (e.g., as part of the estimation algorithm, including at 505, 510, 515, 520, and/or at 525). The result of near-field or far-field determination (e.g., detection) and orientation estimation may be transmitted to the transmitter wireless device, UE 115-h (e.g., the second wireless device). The determination result (e.g., detection result) may be transmitted indirectly if the choice of 2D or 3D beam weights are exchanged. For example, since the selection of beam weights may be based on whether the second wireless device is disposed near-field or far-field from the first wireless device, transmitting an indication of beam weights corresponding to near-field or far-field may implicitly indicate the respective field. The distance between the transmitter antenna array panel and the receiver antenna array panel and the orientation parameters may not be known or may vary with time. As such, these parameters may be estimated by the algorithm or techniques described herein.

In some examples, for detection of near-field versus far-field, the values of $r_T$ and $r_R$ may not be needed as long as the receiver wireless device, UE 115-*g*, receives or knows that the transmitter antennas and the receiver antennas are equally spaced apart. In some examples, the UE 115-*g* may determine the near-field versus far-field even if the antennas are unequally spaced as long the receiver wireless device, UE 115-*g*, receives or knows the distance values or the antenna placement pattern. In any cases, linear regression or another type of analysis may be performed. For example, the values of $r_T$ and $r_R$ may be replaced an antenna index. If the antenna distance in the antenna placement pattern is uniform, the antenna index may be translated to distance with an unknown unit, and the unknown unit may not impact the decision between near-field versus far-field. If the antenna distance in the antenna placement pattern is not uniform, the detection algorithm may still be applied if the antenna index may be mapped to a distance with an unknown unit. In another form, the "invariance" of the square of estimation or variance with respect to the distance unit is $|\hat{C}|^2 = \hat{C}\hat{C}^H = (R^H R)^{-1} R^H (PP^H)(R^H R)^{-1} R$, and qualitatively, this is approximately $(R^H R)^{-1}(PP^H)$, where C, R, and P correspond to the same-named matrices discussed above. The covariance of $\hat{C} \sim \sigma^2 (R^H R)^{-1}$, and therefore, the "ratio" (qualitatively) between $|\hat{C}|^2$ and the covariance of $\hat{C}$ is $(PP^H)/\sigma^2$. Accordingly, the detection performance of near-field versus far-field may not be affected by a change in the distance unit.

Figure 6:
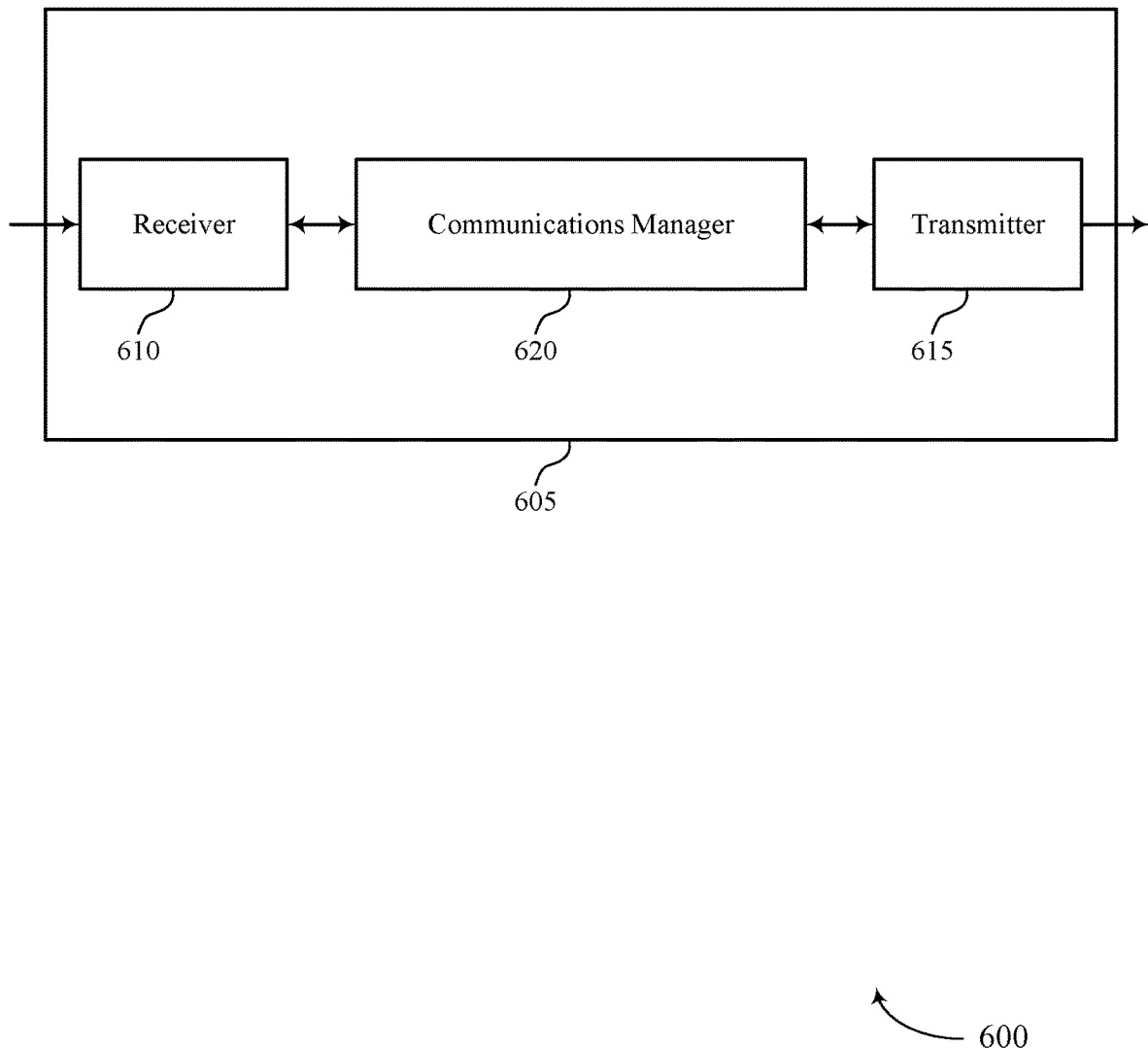
FIGS. 6 and 7 show block diagrams of devices that support detection of near-field location for wireless communications in accordance with one or more aspects of the present disclosure.

FIG. 6 shows a block diagram 600 of a device 605 that supports detection of near-field location for wireless communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to detection of near-field location for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to detection of near-field location for wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of detection of near-field location for wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first wireless device in accordance with examples as disclosed herein. For example, the communications manager 620 is capable of, configured to, or operable to support a means for receiving, at a first antenna array, a set of multiple reference signals from a second antenna array of a second wireless device. The communications manager 620 is capable of, configured to, or operable to support a means for measuring a set of multiple phases of the set of multiple reference signals, where the set of multiple phases correspond to respective antenna pairs that each include a respective first antenna of the first antenna array and a respective second antenna of the second antenna array. The communications manager 620 is capable of, configured to, or operable to support a means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. The communications manager 620 is capable of, configured to, or operable to support a means for determining that at least one second order angle parameter of the set of multiple second order angle parameters satisfies an angle parameter threshold. The communications manager 620 is capable of, configured to, or operable to support a means for communicating with the second wireless device based on the determination that at least one second order angle parameter of the set of multiple second order angle parameters satisfies the angle parameter threshold.

Additionally, or alternatively, the communications manager 620 may support wireless communications at a first wireless device in accordance with examples as disclosed herein. For example, the communications manager 620 is capable of, configured to, or operable to support a means for receiving, at the first antenna array, a set of multiple reference signals from a second antenna array of a third wireless device. The communications manager 620 is capable of, configured to, or operable to support a means for measuring a set of multiple phases of the set of multiple reference signals, where the set of multiple phases correspond to respective antenna pairs that each include a respective first antenna of the first antenna array and a respective second antenna of the second antenna array. The communications manager 620 is capable of, configured to, or operable to support a means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. The communications manager 620 is capable of, configured to, or operable to support a means for determining that none of the set of multiple second order angle parameters satisfy the angle parameter threshold. The communications manager 620 is capable of, configured to, or operable to support a means for communicating with the second wireless device based on the determination that none of the set of multiple second order angle parameters satisfy the angle parameter threshold.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for efficiently determining whether a transmitter device is positioned in a near-field distance or a far-field distance from a receiver device without using specialized measuring devices.

Figure 7:
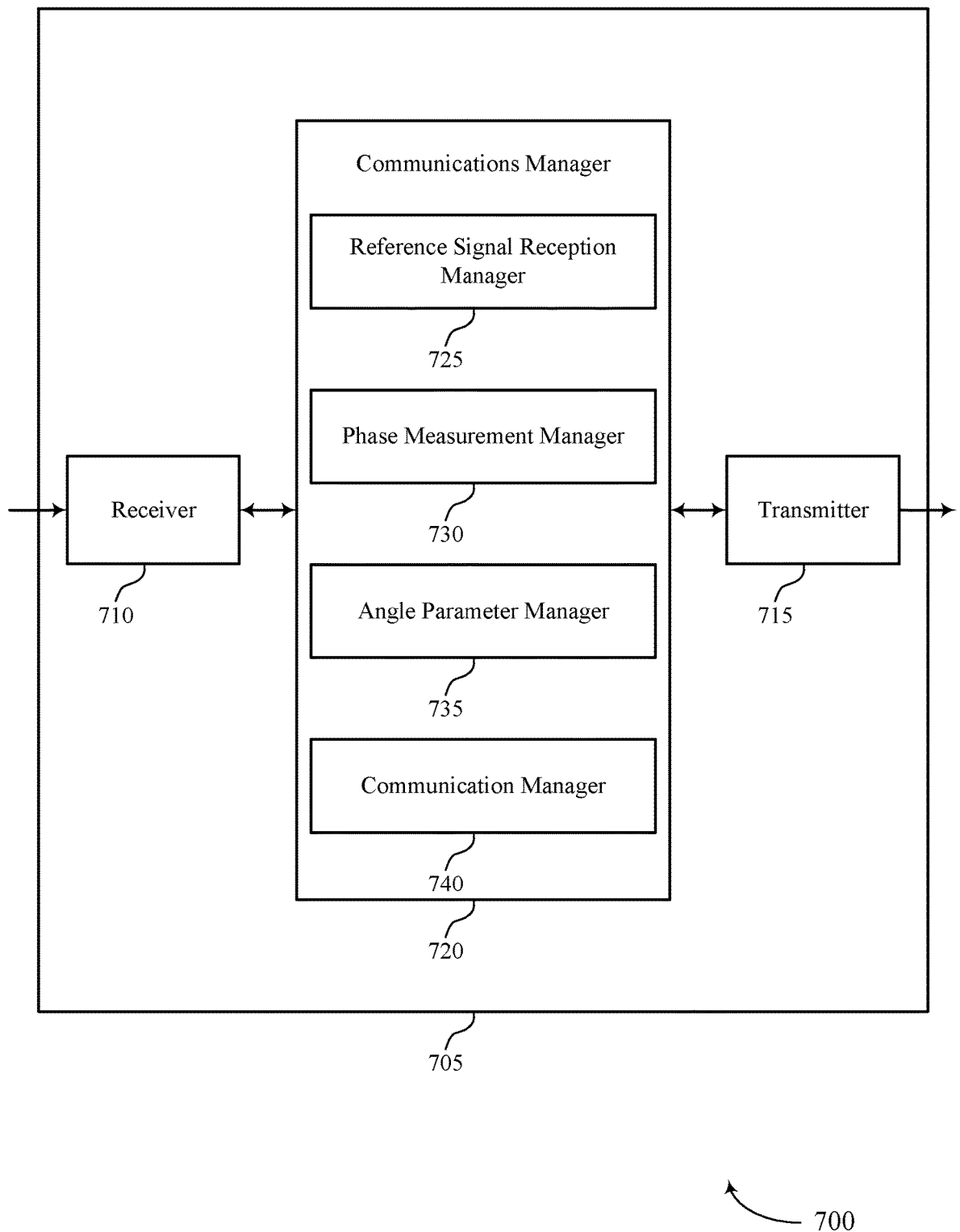

FIG. 7 shows a block diagram 700 of a device 705 that supports detection of near-field location for wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to detection of near-field location for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to detection of near-field location for wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of detection of near-field location for wireless communications as described herein. For example, the communications manager 720 may include a reference signal reception manager 725, a phase measurement manager 730, an angle parameter manager 735, a communication manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first wireless device in accordance with examples as disclosed herein. The reference signal reception manager 725 is capable of, configured to, or operable to support a means for receiving, at a first antenna array, a set of multiple reference signals from a second antenna array of a second wireless device. The phase measurement manager 730 is capable of, configured to, or operable to support a means for measuring a set of multiple phases of the set of multiple reference signals, where the set of multiple phases correspond to respective antenna pairs that each include a respective first antenna of the first antenna array and a respective second antenna of the second antenna array. The angle parameter manager 735 is capable of, configured to, or operable to support a means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. The angle parameter manager 735 is capable of, configured to, or operable to support a means for determining that at least one second order angle parameter of the set of multiple second order angle parameters satisfies an angle parameter threshold. The communication manager 740 is capable of, configured to, or operable to support a means for communicating with the second wireless device based on the determination that at least one second order angle parameter of the set of multiple second order angle parameters satisfies the angle parameter threshold.

Additionally, or alternatively, the communications manager 720 may support wireless communications at a first wireless device in accordance with examples as disclosed herein. The reference signal reception manager 725 is capable of, configured to, or operable to support a means for receiving, at the first antenna array, a set of multiple reference signals from a second antenna array of a third wireless device. The phase measurement manager 730 is capable of, configured to, or operable to support a means for measuring a set of multiple phases of the set of multiple reference signals, where the set of multiple phases correspond to respective antenna pairs that each include a respective first antenna of the first antenna array and a respective second antenna of the second antenna array. The angle parameter manager 735 is capable of, configured to, or operable to support a means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. The angle parameter manager 735 is capable of, configured to, or operable to support a means for determining that none of the set of multiple second order angle parameters satisfy the angle parameter threshold. The communication manager 740 is capable of, configured to, or operable to support a means for communicating with the second wireless device based on the determination that none of the set of multiple second order angle parameters satisfy the angle parameter threshold.

Figure 8:
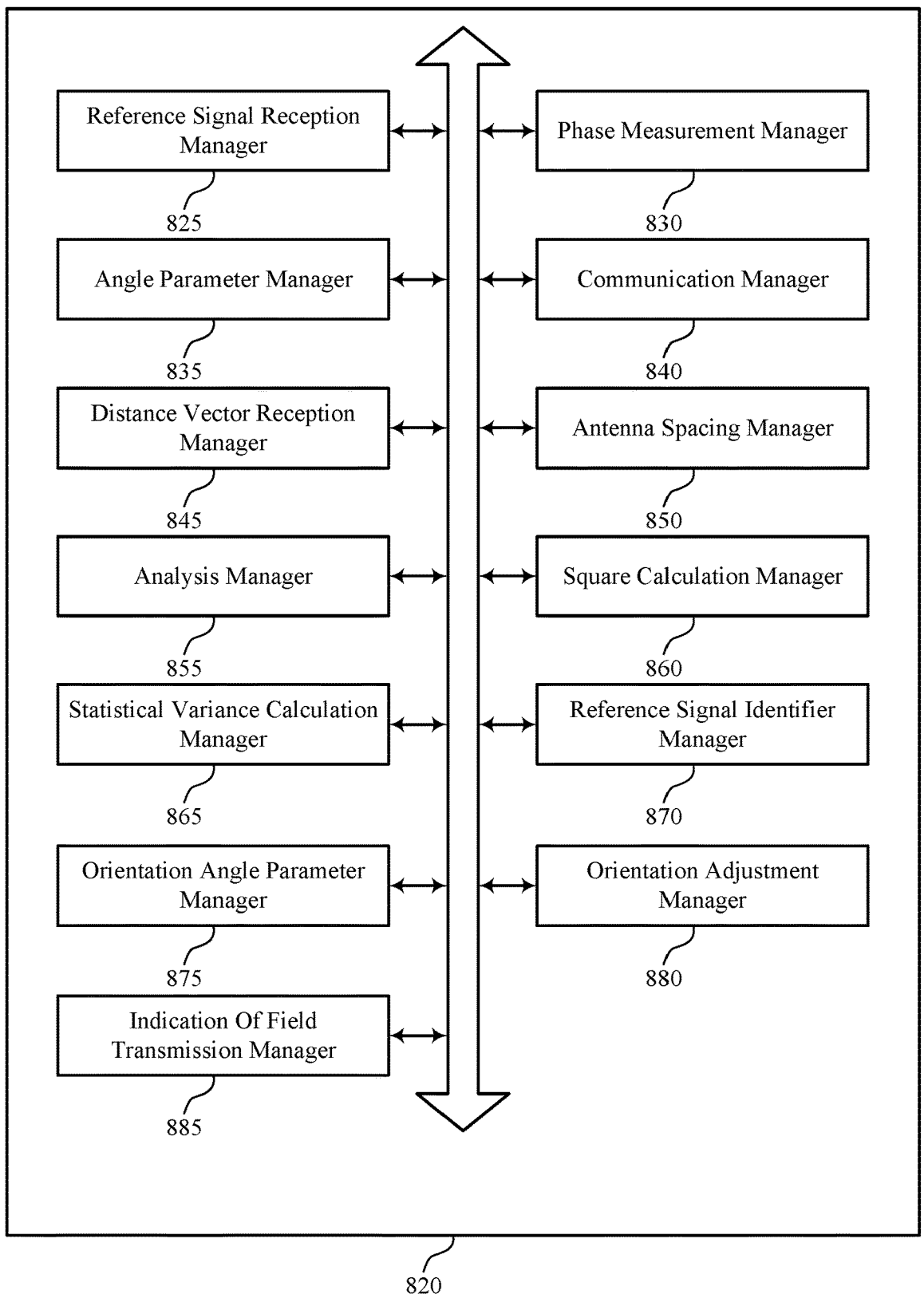
FIG. 8 shows a block diagram of a communications manager that supports detection of near-field location for wireless communications in accordance with one or more aspects of the present disclosure.

FIG. 8 shows a block diagram 800 of a communications manager 820 that supports detection of near-field location for wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of detection of near-field location for wireless communications as described herein. For example, the communications manager 820 may include a reference signal reception manager 825, a phase measurement manager 830, an angle parameter manager 835, a communication manager 840, a distance vector reception manager 845, an antenna spacing manager 850, an analysis manager 855, a square calculation manager 860, a statistical variance calculation manager 865, a reference signal identifier manager 870, an orientation angle parameter manager 875, an orientation adjustment manager 880, an indication of field transmission manager 885, or any combination thereof. Each of these components may communicate, directly or indirectly, with one another (e.g., via one or more buses).

The communications manager 820 may support wireless communications at a first wireless device in accordance with examples as disclosed herein. The reference signal reception manager 825 is capable of, configured to, or operable to support a means for receiving, at a first antenna array, a set of multiple reference signals from a second antenna array of a second wireless device. The phase measurement manager 830 is capable of, configured to, or operable to support a means for measuring a set of multiple phases of the set of multiple reference signals, where the set of multiple phases correspond to respective antenna pairs that each include a respective first antenna of the first antenna array and a respective second antenna of the second antenna array. The angle parameter manager 835 is capable of, configured to, or operable to support a means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. In some examples, the angle parameter manager 835 is capable of, configured to, or operable to support a means for determining that at least one second order angle parameter of the set of multiple second order angle parameters satisfies an angle parameter threshold. The communication manager 840 is capable of, configured to, or operable to support a means for communicating with the second wireless device based on the determination that at least one second order angle parameter of the set of multiple second order angle parameters satisfies the angle parameter threshold.

In some examples, the distance vector reception manager 845 is capable of, configured to, or operable to support a means for receiving, from the second wireless device, an indication of a second distance vector for the second antenna array, the second distance vector including distances between respective antennas of the second antenna array and the center of the second antenna array. In some examples, the angle parameter manager 835 is capable of, configured to, or operable to support a means for determining the set of multiple first order angle parameters and the set of multiple second order angle parameters determining the multiple first order angle parameters and the multiple second order angle parameters using the second distance vector and a first distance vector for the first antenna array, the first distance vector including distances between respective antennas of the first antenna array and the center of the first antenna array (e.g., such determining being based on linear regression or another type of analysis).

In some examples, the antenna spacing manager 850 is capable of, configured to, or operable to support a means for receiving an indication of a spacing between antennas of the second antenna array. In some examples, the analysis manager 855 is capable of, configured to, or operable to support a means for determining the set of multiple first order angle parameters and the set of multiple second order angle parameters, including doing so based on a mapping between respective antenna indices for antennas of the first antenna array and respective distances from the center of the second antenna array (e.g., using linear regression or another type of analysis).

In some examples, to support determining that at least one of the set of multiple second order angle parameters satisfies the angle parameter threshold, the square calculation manager 860 is capable of, configured to, or operable to support a means for determining that a second order angle parameter has a magnitude that satisfies the angle parameter threshold, where the angle parameter threshold is based at least in part on a standard deviation associated with the second order angle parameter. In some examples, to support determining that at least one of the set of multiple second order angle parameters is greater than the angle parameter threshold, the angle parameter manager 835 is capable of, configured to, or operable to support a means for determining that a square of a second order angle parameter satisfies the angle parameter threshold, where the angle parameter threshold is based at least in part on a statistical variance associated with the second order angle parameter.

In some examples, the reference signal reception manager 825 is capable of, configured to, or operable to support a means for receiving, at the first antenna array, a second set of multiple reference signals from a third antenna array of a third wireless device. In some examples, the phase measurement manager 830 is capable of, configured to, or operable to support a means for measuring a second set of multiple phases of the second set of multiple reference signals, where the second set of multiple phases correspond to respective antenna pairs that each include a respective first antenna of the first antenna array and a respective third antenna of the third antenna array. In some examples, the angle parameter manager 835 is capable of, configured to, or operable to support a means for determining, based on the second set of multiple phases, a second set of multiple angle parameters including a second set of multiple first order angle parameters and a second set of multiple second order angle parameters, where the second set of multiple first order angle parameters includes linear terms associated with the distance between the first antenna of the first antenna array and the center of the first antenna array or a distance between a third antenna of the third antenna array and a center of the third antenna array, and where the set of multiple second order angle parameters includes quadratic terms associated with the distance between the first antenna of the first antenna array and the center of the first antenna array or the distance between the third antenna of the third antenna array and the center of the third antenna array. In some examples, the angle parameter manager 835 is capable of, configured to, or operable to support a means for determining that none of the second set of multiple second order angle parameters satisfy the angle parameter threshold. In some examples, the communication manager 840 is capable of, configured to, or operable to support a means for communicating with the third wireless device based on the determination that none of the second set of multiple second order angle parameters satisfy the angle parameter threshold.

In some examples, the reference signal identifier manager 870 is capable of, configured to, or operable to support a means for receiving a unique identifier associated with each of the set of multiple reference signals, where the set of multiple reference signals are frequency-division multiplexed with one another, time-division multiplexed with one another, or any combination thereof.

In some examples, the orientation angle parameter manager 875 is capable of, configured to, or operable to support a means for determining a first orientation angle parameter associated with the first wireless device and a second orientation angle parameter associated with the second wireless device, the first orientation angle parameter and the second orientation angle parameter based on the set of multiple second order angle parameters. In some examples, the orientation adjustment manager 880 is capable of, configured to, or operable to support a means for adjusting orientation of the first antenna array based on the first orientation angle parameter, the second orientation angle parameter, or any combination thereof.

In some examples, the indication of field transmission manager 885 is capable of, configured to, or operable to support a means for transmitting, to the second wireless device, an indication of whether the first wireless device is located within a near-field communication distance or a far-field communication distance relative to the second wireless device.

In some examples, the indication includes an indication of beam weights to be applied to the set of multiple reference signals, the beam weights based on whether the first wireless device is located within the near-field communication distance or the far-field communication distance relative to the second wireless device.

In some examples, determining the set of multiple first order angle parameters may be based on determining the set of multiple second order angle parameters.

Figure 9:
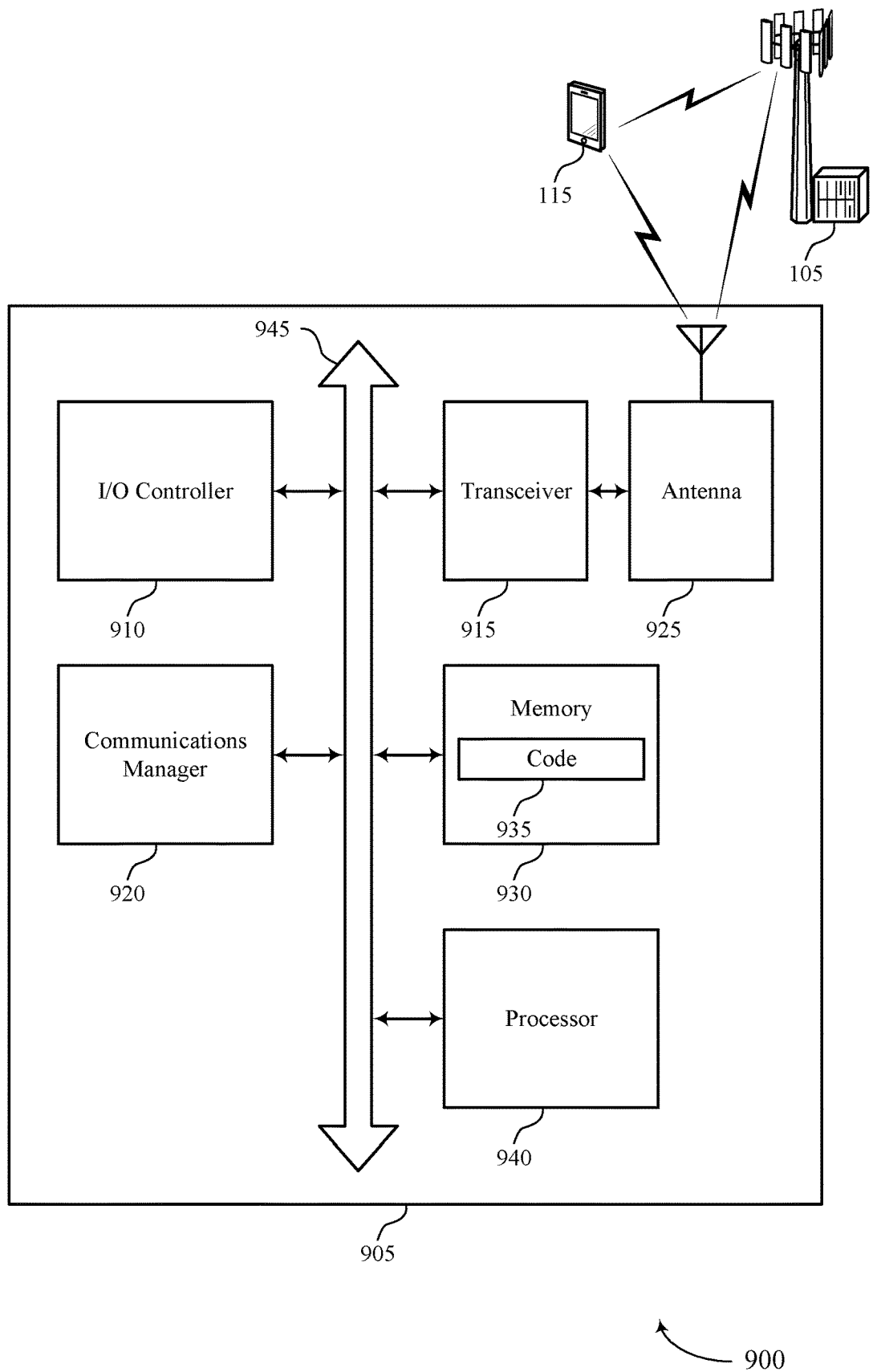
FIG. 9 shows a diagram of a system including a device that supports detection of near-field location for wireless communications in accordance with one or more aspects of the present disclosure.

FIG. 9 shows a diagram of a system 900 including a device 905 that supports detection of near-field location for wireless communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include one or more intelligent hardware devices (e.g., a general-purpose processor, a DSP, a CPU, a microcontroller, an ASIC, an FPGA, a programmable logic device, a discrete gate or transistor logic component, a discrete hardware component, or any quantity of such devices in any combination). For example, processor 940 may be implemented as a single intelligent hardware device (e.g., a single processor) or as multiple intelligent hardware devices (e.g., multiple processors), and where processor 940 is implemented as multiple intelligent hardware devices, any combination of the intelligent hardware devices may perform any combination of functions described herein (e.g., any combination of functions described with reference to FIG. 10 or elsewhere herein). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting detection of near-field location for wireless communications). For example, the device 905 or a component of the device 905 may include a processor 940 and memory 930 coupled with or to the processor 940, the processor 940 and memory 930 configured to perform various functions described herein.

The communications manager 920 may support wireless communications at a first wireless device in accordance with examples as disclosed herein. For example, the communications manager 920 is capable of, configured to, or operable to support a means for receiving, at a first antenna array, a set of multiple reference signals from a second antenna array of a second wireless device. The communications manager 920 is capable of, configured to, or operable to support a means for measuring a set of multiple phases of the set of multiple reference signals, where the set of multiple phases correspond to respective antenna pairs that each include a respective first antenna of the first antenna array and a respective second antenna of the second antenna array. The communications manager 920 is capable of, configured to, or operable to support a means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. The communications manager 920 is capable of, configured to, or operable to support a means for determining that at least one second order angle parameter of the set of multiple second order angle parameters satisfies an angle parameter threshold. The communications manager 920 is capable of, configured to, or operable to support a means for communicating with the second wireless device based on the determination that at least one second order angle parameter of the set of multiple second order angle parameters satisfies the angle parameter threshold.

Additionally, or alternatively, the communications manager 920 may support wireless communications at a first wireless device in accordance with examples as disclosed herein. For example, the communications manager 920 is capable of, configured to, or operable to support a means for receiving, at the first antenna array, a set of multiple reference signals from a second antenna array of a third wireless device. The communications manager 920 is capable of, configured to, or operable to support a means for measuring a set of multiple phases of the set of multiple reference signals, where the set of multiple phases correspond to respective antenna pairs that each include a respective first antenna of the first antenna array and a respective second antenna of the second antenna array. The communications manager 920 is capable of, configured to, or operable to support a means for determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or a distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. The communications manager 920 is capable of, configured to, or operable to support a means for determining that none of the set of multiple second order angle parameters satisfy the angle parameter threshold. The communications manager 920 is capable of, configured to, or operable to support a means for communicating with the second wireless device based on the determination that none of the set of multiple second order angle parameters satisfy the angle parameter threshold.

By including or configuring the communications manager 920 in accordance with examples as described herein, the device 905 may support techniques for efficiently determining whether a transmitter device is positioned in a near-field distance or a far-field distance from a receiver device without using specialized measuring devices.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of detection of near-field location for wireless communications as described herein, or the processor 940 and the memory 930 may be otherwise configured to perform or support such operations.

Figure 10:
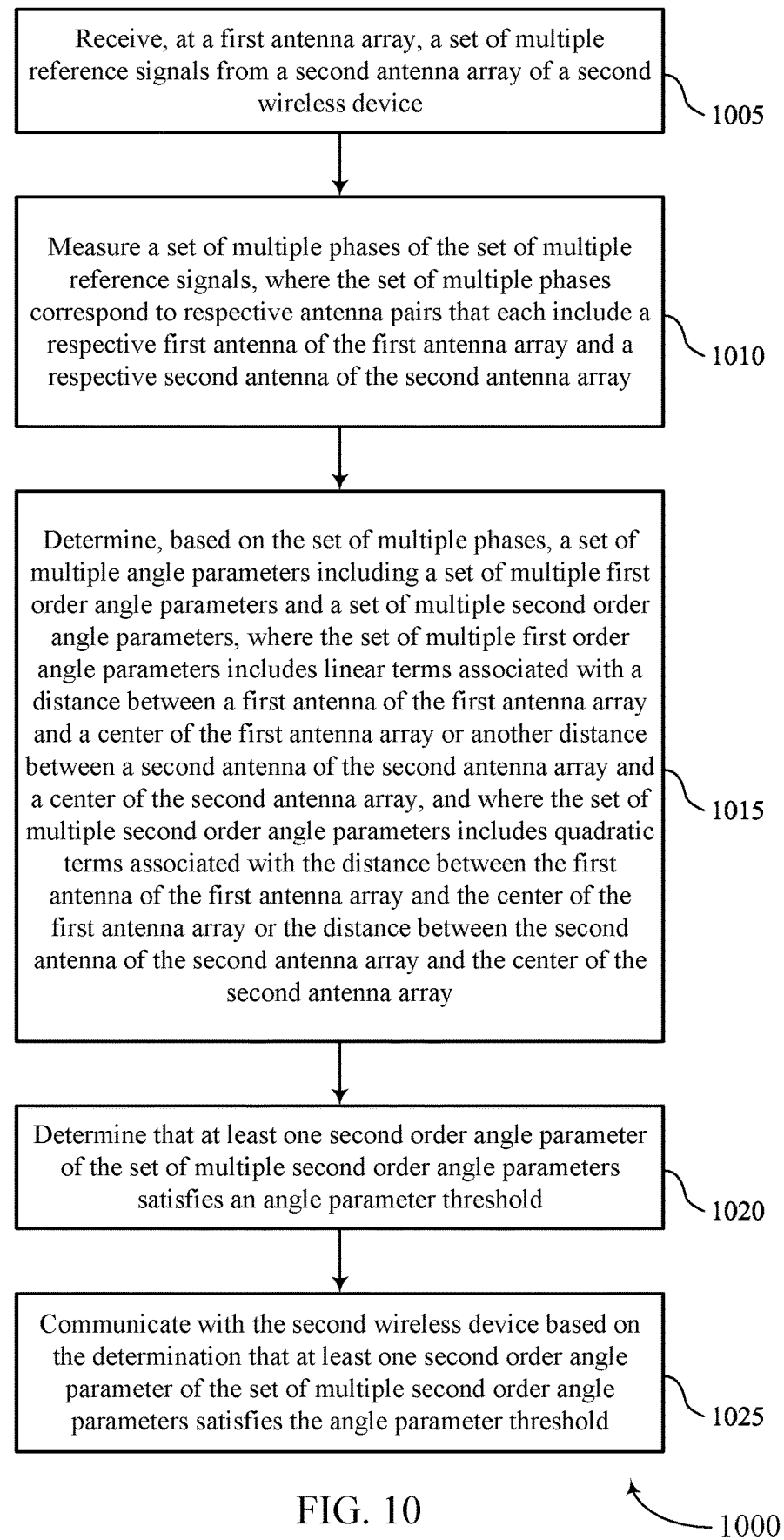
FIG. 10 shows a flowchart illustrating methods that support detection of near-field location for wireless communications in accordance with one or more aspects of the present disclosure.

FIG. 10 shows a flowchart illustrating a method 1000 that supports detection of near-field location for wireless communications in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, at a first antenna array, a set of multiple reference signals from a second antenna array of a second wireless device. The operations of 1005 may be performed in accordance with examples as disclosed herein. In some examples, aspects of the operations of 1005 may be performed by a reference signal reception manager 825 as described with reference to FIG. 8. Additionally or alternatively, means for performing 1005 may, but not necessarily, include, for example, antenna 925, transceiver 915, communications manager 920, memory 930 (including code 935), processor 940 and/or bus 945.

At 1010, the method may include measuring a set of multiple phases of the set of multiple reference signals, where the set of multiple phases correspond to respective antenna pairs that each include a respective first antenna of the first antenna array and a respective second antenna of the second antenna array. The operations of 1010 may be performed in accordance with examples as disclosed herein. In some examples, aspects of the operations of 1010 may be performed by a phase measurement manager 830 as described with reference to FIG. 8. Additionally or alternatively, means for performing 1010 may, but not necessarily, include, for example, antenna 925, transceiver 915, communications manager 920, memory 930 (including code 935), processor 940 and/or bus 945.

At 1015, the method may include determining, based on the set of multiple phases, a set of multiple angle parameters including a set of multiple first order angle parameters and a set of multiple second order angle parameters, where the set of multiple first order angle parameters includes linear terms associated with a distance between a first antenna of the first antenna array and a center of the first antenna array or another distance between a second antenna of the second antenna array and a center of the second antenna array, and where the set of multiple second order angle parameters includes quadratic terms associated with the distance between the first antenna of the first antenna array and the center of the first antenna array or the distance between the second antenna of the second antenna array and the center of the second antenna array. The operations of 1015 may be performed in accordance with examples as disclosed herein. In some examples, aspects of the operations of 1015 may be performed by an angle parameter manager 835 as described with reference to FIG. 8. Additionally or alternatively, means for performing 1015 may, but not necessarily, include, for example, antenna 925, transceiver 915, communications manager 920, memory 930 (including code 935), processor 940 and/or bus 945.

At 1020, the method may include determining that at least one second order angle parameter of the set of multiple second order angle parameters satisfies an angle parameter threshold. The operations of 1020 may be performed in accordance with examples as disclosed herein. In some examples, aspects of the operations of 1020 may be performed by an angle parameter manager 835 as described with reference to FIG. 8. Additionally or alternatively, means for performing 1020 may, but not necessarily, include, for example, antenna 925, transceiver 915, communications manager 920, memory 930 (including code 935), processor 940 and/or bus 945.

At 1025, the method may include communicating with the second wireless device based on the determination that at least one second order angle parameter of the set of multiple second order angle parameters satisfies the angle parameter threshold. The operations of 1025 may be performed in accordance with examples as disclosed herein. In some examples, aspects of the operations of 1025 may be performed by a communication manager 840 as described with reference to FIG. 8. Additionally or alternatively, means for performing 1025 may, but not necessarily, include, for example, antenna 925, transceiver 915, communications manager 920, memory 930 (including code 935), processor 940 and/or bus 945.

The following provides an overview of aspects of the present disclosure:

Aspect 1: A method for wireless communications at a first wireless device, comprising: receiving, at a first antenna array, a plurality of reference signals from a second antenna array of a second wireless device; measuring a plurality of phases of the plurality of reference signals, wherein the plurality of phases correspond to respective antenna pairs that each comprise a respective first antenna of the first antenna array and a respective second antenna of the second antenna array; determining, based at least in part on the plurality of phases, a plurality of angle parameters comprising a plurality of first order angle parameters and a plurality of second order angle parameters, wherein the plurality of first order angle parameters comprises linear terms associated with a distance between a first antenna of the first antenna array and a center of the first antenna array or a distance between a second antenna of the second antenna array and a center of the second antenna array, and wherein the plurality of second order angle parameters comprises quadratic terms associated with the distance between the first antenna of the first antenna array and the center of the first antenna array or the distance between the second antenna of the second antenna array and the center of the second antenna array; determining that at least one second order angle parameter of the plurality of second order angle parameters satisfies an angle parameter threshold; and communicating with the second wireless device based at least in part on the determination that at least one second order angle parameter of the plurality of second order angle parameters satisfies the angle parameter threshold.

Aspect 2: The method of aspect 1, further comprising: receiving, from the second wireless device, an indication of a second distance vector for the second antenna array, the second distance vector comprising distances between respective antennas of the second antenna array and the center of the second antenna array, wherein determining the plurality of first order angle parameters and the plurality of second order angle parameters is further based at least in part on the second distance vector and a first distance vector for the first antenna array, the first distance vector comprising distances between respective antennas of the first antenna array and the center of the first antenna array.

Aspect 3: The method of any of aspects 1 through 2, further comprising: receiving an indication of a spacing between antennas of the second antenna array, wherein determining the plurality of first order angle parameters and the plurality of second order angle parameters is further based at least in part on a mapping between respective antenna indices for antennas of the first antenna array and respective distances from the center of the second antenna array.

Aspect 4: The method of any of aspects 1 through 3, wherein determining that at least one of the plurality of second order angle parameters satisfies the angle parameter threshold comprises: determining that a second order angle parameter has a magnitude that satisfies the angle parameter threshold, wherein the angle parameter threshold is based at least in part on a standard deviation associated with the second order angle parameter; or determining that a square of a second order angle parameter satisfies the angle parameter threshold, wherein the angle parameter threshold is based at least in part on a statistical variance associated with the second order angle parameter.

Aspect 5: The method of any of aspects 1 through 4, further comprising: receiving, at the first antenna array, a second plurality of reference signals from a third antenna array of a third wireless device; measuring a second plurality of phases of the second plurality of reference signals, wherein the second plurality of phases correspond to respective antenna pairs that each comprise a respective first antenna of the first antenna array and a respective third antenna of the third antenna array; determining, based at least in part on the second plurality of phases, a second plurality of angle parameters comprising a second plurality of first order angle parameters and a second plurality of second order angle parameters, wherein the second plurality of first order angle parameters comprises linear terms associated with a distance between the first antenna of the first antenna array and the center of the first antenna array or a distance between a third antenna of the third antenna array and a center of the third antenna array, and wherein the plurality of second order angle parameters comprises quadratic terms associated with the distance between the first antenna of the first antenna array and the center of the first antenna array or the distance between the third antenna of the third antenna array and the center of the third antenna array; determining that none of the second plurality of second order angle parameters satisfy the angle parameter threshold; and communicating with the third wireless device based at least in part on the determination that none of the second plurality of second order angle parameters satisfy the angle parameter threshold.

Aspect 6: The method of any of aspects 1 through 5, further comprising: receiving a unique identifier associated with each of the plurality of reference signals, wherein the plurality of reference signals are frequency-division multiplexed with one another, time-division multiplexed with one another, or any combination thereof.

Aspect 7: The method of any of aspects 1 through 6, further comprising: determining a first orientation angle parameter associated with the first wireless device and a second orientation angle parameter associated with the second wireless device, the first orientation angle parameter and the second orientation angle parameter based at least in part on the plurality of second order angle parameters; and adjusting orientation of the first antenna array based at least in part on the first orientation angle parameter, the second orientation angle parameter, or any combination thereof.

Aspect 8: The method of any of aspects 1 through 7, further comprising: transmitting, to the second wireless device, an indication of whether the first wireless device is located within a near-field communication distance or a far-field communication distance relative to the second wireless device.

Aspect 9: The method of aspect 8, wherein the indication comprises an indication of beam weights to be applied to the plurality of reference signals, the beam weights based at least in part on whether the first wireless device is located within the near-field communication distance or the far-field communication distance relative to the second wireless device.

Aspect 10: The method of any of aspects 1 through 9, wherein determining the plurality of first order angle parameters is based at least in part on determining the plurality of second order angle parameters.

Aspect 11: An apparatus for wireless communications at a first wireless device, comprising memory, a transceiver, and at least one processor coupled with the memory and the transceiver, the at least one processor configured to cause the apparatus to perform a method of any of aspects 1 through 10.

Aspect 12: An apparatus for wireless communications at a first wireless device, comprising at least one means for performing a method of any of aspects 1 through 10.

Aspect 13: A non-transitory computer-readable medium storing code for wireless communications at a first wireless device, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination of any quantity thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first wireless device, comprising:
   memory;
   a transceiver; and
   at least one processor of the first wireless device, the at least one processor coupled with the memory and the transceiver and configured to cause the apparatus to:
      receive, via the transceiver and a first antenna array, a plurality of reference signals from a second antenna array of a second wireless device;
      measure a plurality of phases of the plurality of reference signals, wherein the plurality of phases correspond to respective antenna pairs that each comprise a respective first antenna of the first antenna array and a respective second antenna of the second antenna array;
      determine, based at least in part on the plurality of phases, a plurality of angle parameters comprising a plurality of first order angle parameters and a plurality of second order angle parameters, wherein the plurality of first order angle parameters comprises linear terms associated with a distance between a first antenna of the first antenna array and a center of the first antenna array or a distance between a second antenna of the second antenna array and a center of the second antenna array, and wherein the plurality of second order angle parameters comprises quadratic terms associated with the distance between the first antenna of the first antenna array and the center of the first antenna array or the distance between the second antenna of the second antenna array and the center of the second antenna array;
      determine that at least one second order angle parameter of the plurality of second order angle parameters satisfies an angle parameter threshold; and
      communicate, via the transceiver, with the second wireless device based at least in part on the determination that at least one second order angle parameter of the plurality of second order angle parameters satisfies the angle parameter threshold.

2. The apparatus of claim 1, the at least one processor further configured to cause the apparatus to:
   receive, from the second wireless device via the transceiver, an indication of a second distance vector for the second antenna array, the second distance vector comprising distances between respective antennas of the second antenna array and the center of the second antenna array,
   wherein the at least one processor is configured to cause the apparatus to determine the plurality of first order angle parameters and the plurality of second order angle parameters using the second distance vector and a first distance vector for the first antenna array, the first distance vector comprising distances between respective antennas of the first antenna array and the center of the first antenna array.

3. The apparatus of claim 1, the at least one processor further configured to cause the apparatus to:
   receive, via the transceiver, an indication of a spacing between antennas of the second antenna array,
   wherein the at least one processor is configured to cause the apparatus to determine the plurality of first order angle parameters and the plurality of second order angle parameters based at least in part on a mapping between respective antenna indices for antennas of the first antenna array and respective distances from the center of the second antenna array.

4. The apparatus of claim 1, wherein, to determine that at least one of the plurality of second order angle parameters satisfies the angle parameter threshold, the at least one processor is configured to cause the apparatus to:
   determine that a second order angle parameter has a magnitude that satisfies the angle parameter threshold, wherein the angle parameter threshold is based at least in part on a standard deviation associated with the second order angle parameter; or
   determine that a square of a second order angle parameter satisfies the angle parameter threshold, wherein the angle parameter threshold is based at least in part on a statistical variance associated with the second order angle parameter.

5. The apparatus of claim 1, the at least one processor further configured to cause the apparatus to:
   receive, via the transceiver and the first antenna array, a second plurality of reference signals from a third antenna array of a third wireless device;
   measure a second plurality of phases of the second plurality of reference signals, wherein the second plurality of phases correspond to respective antenna pairs that each comprise a respective first antenna of the first antenna array and a respective third antenna of the third antenna array;
   determine, based at least in part on the second plurality of phases, a second plurality of angle parameters comprising a second plurality of first order angle parameters and a second plurality of second order angle parameters, wherein the second plurality of first order angle parameters comprises linear terms associated with the distance between the first antenna of the first antenna array and the center of the first antenna array or a distance between a third antenna of the third antenna array and a center of the third antenna array, and wherein the second plurality of second order angle parameters comprises quadratic terms associated with the distance between the first antenna of the first antenna array and the center of the first antenna array or the distance between the third antenna of the third antenna array and the center of the third antenna array;
   determine that none of the second plurality of second order angle parameters satisfy the angle parameter threshold; and
   communicate, via the transceiver, with the third wireless device based at least in part on the determination that none of the second plurality of second order angle parameters satisfy the angle parameter threshold.

6. The apparatus of claim 1, the at least one processor further configured to cause the apparatus to:
   receive, via the transceiver, a unique identifier associated with each of the plurality of reference signals, wherein the plurality of reference signals are frequency-division multiplexed with one another, time-division multiplexed with one another, or any combination thereof.

7. The apparatus of claim 1, the at least one processor further configured to cause the apparatus to:
  determine a first orientation angle parameter associated with the first wireless device and a second orientation angle parameter associated with the second wireless device, the first orientation angle parameter and the second orientation angle parameter based at least in part on the plurality of second order angle parameters; and
  adjust orientation of the first antenna array based at least in part on the first orientation angle parameter, the second orientation angle parameter, or any combination thereof.

8. The apparatus of claim 1, the at least one processor further configured to cause the apparatus to:
  transmit, to the second wireless device via the transceiver, an indication of whether the first wireless device is located within a near-field communication distance or a far-field communication distance relative to the second wireless device.

9. The apparatus of claim 8, wherein the indication comprises an indication of beam weights to be applied to the plurality of reference signals, the beam weights based at least in part on whether the first wireless device is located within in the near-field communication distance or the far-field communication distance relative to the second wireless device.

10. The apparatus of claim 1, wherein the at least one processor is configured to cause the apparatus to determine the plurality of first order angle parameters based at least in part on determining the plurality of second order angle parameters.

11. A method for wireless communications at a first wireless device, comprising:
  receiving, at a first antenna array, a plurality of reference signals from a second antenna array of a second wireless device;
  measuring a plurality of phases of the plurality of reference signals, wherein the plurality of phases correspond to respective antenna pairs that each comprise a respective first antenna of the first antenna array and a respective second antenna of the second antenna array;
  determining, based at least in part on the plurality of phases, a plurality of angle parameters comprising a plurality of first order angle parameters and a plurality of second order angle parameters, wherein the plurality of first order angle parameters comprises linear terms associated with a distance between a first antenna of the first antenna array and a center of the first antenna array or a distance between a second antenna of the second antenna array and a center of the second antenna array, and wherein the plurality of second order angle parameters comprises quadratic terms associated with the distance between the first antenna of the first antenna array and the center of the first antenna array or the distance between the second antenna of the second antenna array and the center of the second antenna array;
  determining that at least one second order angle parameter of the plurality of second order angle parameters satisfies an angle parameter threshold; and
  communicating with the second wireless device based at least in part on the determination that at least one second order angle parameter of the plurality of second order angle parameters satisfies the angle parameter threshold.

12. The method of claim 11, further comprising:
  receiving, from the second wireless device, an indication of a second distance vector for the second antenna array, the second distance vector comprising distances between respective antennas of the second antenna array and the center of the second antenna array,
  wherein determining the plurality of first order angle parameters and the plurality of second order angle parameters is further based at least in part on the second distance vector and a first distance vector for the first antenna array, the first distance vector comprising distances between respective antennas of the first antenna array and the center of the first antenna array.

13. The method of claim 11, further comprising:
  receiving an indication of a spacing between antennas of the second antenna array,
  wherein determining the plurality of first order angle parameters and the plurality of second order angle parameters is further based at least in part on a mapping between respective antenna indices for antennas of the first antenna array and respective distances from the center of the second antenna array.

14. The method of claim 11, wherein determining that at least one of the plurality of second order angle parameters satisfies the angle parameter threshold comprises:
  determining that a second order angle parameter has a magnitude that satisfies the angle parameter threshold, wherein the angle parameter threshold is based at least in part on a standard deviation associated with the second order angle parameter; or
  determining that a square of a second order angle parameter satisfies the angle parameter threshold, wherein the angle parameter threshold is based at least in part on a statistical variance associated with the second order angle parameter.

15. The method of claim 11, further comprising:
  receiving, at the first antenna array, a second plurality of reference signals from a third antenna array of a third wireless device;
  measuring a second plurality of phases of the second plurality of reference signals, wherein the second plurality of phases correspond to respective antenna pairs that each comprise a respective first antenna of the first antenna array and a respective third antenna of the third antenna array;
  determining, based at least in part on the second plurality of phases, a second plurality of angle parameters comprising a second plurality of first order angle parameters and a second plurality of second order angle parameters, wherein the second plurality of first order angle parameters comprises linear terms associated with a distance between the first antenna of the first antenna array and the center of the first antenna array or a distance between a third antenna of the third antenna array and a center of the third antenna array, and wherein the plurality of second order angle parameters comprises quadratic terms associated with the distance between the first antenna of the first antenna array and the center of the first antenna array or the distance between the third antenna of the third antenna array and the center of the third antenna array;
  determining that none of the second plurality of second order angle parameters satisfy the angle parameter threshold; and
  communicating with the third wireless device based at least in part on the determination that none of the second plurality of second order angle parameters satisfy the angle parameter threshold.

16. The method of claim 11, further comprising:
receiving a unique identifier associated with each of the plurality of reference signals, wherein the plurality of reference signals are frequency-division multiplexed with one another, time-division multiplexed with one another, or any combination thereof.

17. The method of claim 11, further comprising:
determining a first orientation angle parameter associated with the first wireless device and a second orientation angle parameter associated with the second wireless device, the first orientation angle parameter and the second orientation angle parameter based at least in part on the plurality of second order angle parameters; and
adjusting orientation of the first antenna array based at least in part on the first orientation angle parameter, the second orientation angle parameter, or any combination thereof.

18. The method of claim 11, further comprising:
transmitting, to the second wireless device, an indication of whether the first wireless device is located within a near-field communication distance or a far-field communication distance relative to the second wireless device.

19. The method of claim 18, wherein the indication comprises an indication of beam weights to be applied to the plurality of reference signals, the beam weights based at least in part on whether the first wireless device is located within the near-field communication distance or the far-field communication distance relative to the second wireless device.

20. The method of claim 11, wherein determining the plurality of first order angle parameters is based at least in part on determining the plurality of second order angle parameters.

21. An apparatus for wireless communications at a first wireless device, comprising:
means for receiving, at a first antenna array, a plurality of reference signals from a second antenna array of a second wireless device;
means for measuring a plurality of phases of the plurality of reference signals, wherein the plurality of phases correspond to respective antenna pairs that each comprise a respective first antenna of the first antenna array and a respective second antenna of the second antenna array;
means for determining, based at least in part on the plurality of phases, a plurality of angle parameters comprising a plurality of first order angle parameters and a plurality of second order angle parameters, wherein the plurality of first order angle parameters comprises linear terms associated with a distance between a first antenna of the first antenna array and a center of the first antenna array or a distance between a second antenna of the second antenna array and a center of the second antenna array, and wherein the plurality of second order angle parameters comprises quadratic terms associated with the distance between the first antenna of the first antenna array and the center of the first antenna array or the distance between the second antenna of the second antenna array and the center of the second antenna array;
means for determining that at least one second order angle parameter of the plurality of second order angle parameters satisfies an angle parameter threshold; and
means for communicating with the second wireless device based at least in part on the determination that at least one second order angle parameter of the plurality of second order angle parameters satisfies the angle parameter threshold.

22. The apparatus of claim 21, further comprising:
means for receiving, from the second wireless device, an indication of a second distance vector for the second antenna array, the second distance vector comprising distances between respective antennas of the second antenna array and the center of the second antenna array,
wherein the means for determining the plurality of first order angle parameters and the plurality of second order angle parameters comprises means for determining the plurality of first order angle parameters and the plurality of second order angle parameters using the second distance vector and a first distance vector for the first antenna array, the first distance vector comprising distances between respective antennas of the first antenna array and the center of the first antenna array.

23. The apparatus of claim 21, further comprising:
means for receiving an indication of a spacing between antennas of the second antenna array,
wherein the means for determining the plurality of first order angle parameters and the plurality of second order angle parameters comprises means for determining the plurality of first order angle parameters and the plurality of second order angle parameters based at least in part on a mapping between respective antenna indices for antennas of the first antenna array and respective distances from the center of the second antenna array.

24. The apparatus of claim 21, wherein the means for determining that at least one of the plurality of second order angle parameters satisfies the angle parameter threshold comprises:
means for determining that a second order angle parameter has a magnitude that satisfies the angle parameter threshold, wherein the angle parameter threshold is based at least in part on a standard deviation associated with the second order angle parameter; or
means for determining that a square of a second order angle parameter satisfies the angle parameter threshold, wherein the angle parameter threshold is based at least in part on a statistical variance associated with the second order angle parameter.

25. The apparatus of claim 21, further comprising:
means for receiving, at the first antenna array, a second plurality of reference signals from a third antenna array of a third wireless device;
means for measuring a second plurality of phases of the second plurality of reference signals, wherein the second plurality of phases correspond to respective antenna pairs that each comprise a respective first antenna of the first antenna array and a respective third antenna of the third antenna array;
means for determining, based at least in part on the second plurality of phases, a second plurality of angle parameters comprising a second plurality of first order angle parameters and a second plurality of second order angle parameters, wherein the second plurality of first order angle parameters comprises linear terms associated with a distance between the first antenna of the first antenna array and the center of the first antenna array or a distance between a third antenna of the third antenna array and a center of the third antenna array, and wherein the plurality of second order angle parameters comprises quadratic terms associated with the distance between the first antenna of the first antenna array and the center of the first antenna array or the distance between the third antenna of the third antenna array and the center of the third antenna array;

means for determining that none of the second plurality of second order angle parameters satisfy the angle parameter threshold; and means for communicating with the third wireless device based at least in part on the determination that none of the second plurality of second order angle parameters satisfy the angle parameter threshold.

26. The apparatus of claim 21, further comprising:
means for receiving a unique identifier associated with each of the plurality of reference signals, wherein the plurality of reference signals are frequency-division multiplexed with one another, time-division multiplexed with one another, or any combination thereof.

27. The apparatus of claim 21, further comprising:
means for determining a first orientation angle parameter associated with the first wireless device and a second orientation angle parameter associated with the second wireless device, the first orientation angle parameter and the second orientation angle parameter based at least in part on the plurality of second order angle parameters; and means for adjusting orientation of the first antenna array based at least in part on the first orientation angle parameter, the second orientation angle parameter, or any combination thereof.

28. The apparatus of claim 21, further comprising:
means for transmitting, to the second wireless device, an indication of whether the first wireless device is located within a near-field communication distance or a far-field communication distance relative to the second wireless device.

29. The apparatus of claim 28, wherein the indication comprises an indication of beam weights to be applied to the plurality of reference signals, the beam weights based at least in part on whether the first wireless device is located within the near-field communication distance or the far-field communication distance relative to the second wireless device.

30. A non-transitory computer-readable medium storing code for wireless communications at a first wireless device, the code comprising instructions executable by a processor to cause the first wireless device to:

receive, at a first antenna array, a plurality of reference signals from a second antenna array of a second wireless device;

measure a plurality of phases of the plurality of reference signals, wherein the plurality of phases correspond to respective antenna pairs that each comprise a respective first antenna of the first antenna array and a respective second antenna of the second antenna array;

determine, based at least in part on the plurality of phases, a plurality of angle parameters comprising a plurality of first order angle parameters and a plurality of second order angle parameters, wherein the plurality of first order angle parameters comprises linear terms associated with a distance between a first antenna of the first antenna array and a center of the first antenna array or a distance between a second antenna of the second antenna array and a center of the second antenna array, and wherein the plurality of second order angle parameters comprises quadratic terms associated with the distance between the first antenna of the first antenna array and the center of the first antenna array or the distance between the second antenna of the second antenna array and the center of the second antenna array;

determine that at least one second order angle parameter of the plurality of second order angle parameters satisfies an angle parameter threshold; and communicate with the second wireless device based at least in part on the determination that at least one second order angle parameter of the plurality of second order angle parameters satisfies the angle parameter threshold.

* * * * *